(12) United States Patent
Reisch et al.

(10) Patent No.: US 11,815,169 B2
(45) Date of Patent: Nov. 14, 2023

(54) TRANSMISSION, DRIVE TRAIN AND VEHICLE HAVING A TRANSMISSION

(71) Applicant: ZF Friedrichshafen AG, Friedrichshafen (DE)

(72) Inventors: Matthias Reisch, Ravensburg (DE); Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/771,735

(22) PCT Filed: Oct. 22, 2020

(86) PCT No.: PCT/EP2020/079809
§ 371 (c)(1),
(2) Date: Apr. 25, 2022

(87) PCT Pub. No.: WO2021/078893
PCT Pub. Date: Apr. 29, 2021

(65) Prior Publication Data
US 2022/0364634 A1 Nov. 17, 2022

(30) Foreign Application Priority Data
Oct. 25, 2019 (DE) .......................... 102019216508.7

(51) Int. Cl.
*F16H 48/10* (2012.01)
*F16H 48/22* (2006.01)
(Continued)

(52) U.S. Cl.
CPC ............ *F16H 48/10* (2013.01); *F16H 48/22* (2013.01); *F16H 48/26* (2013.01); *F16H 48/28* (2013.01);
(Continued)

(58) Field of Classification Search
CPC .......... F16H 48/10; F16H 48/22; F16H 48/26; F16H 48/28; F16H 2048/104; F16H 2048/106
See application file for complete search history.

(56) References Cited

U.S. PATENT DOCUMENTS 5,041,069 A    8/1991  Horst
5,845,732 A *  12/1998 Taniguchi .............. B60K 17/16
                                                180/65.6
(Continued)

FOREIGN PATENT DOCUMENTS

DE       39 12304 A1    10/1990
DE   10 2007 031 735 A1  1/2009
(Continued)

OTHER PUBLICATIONS

International Search Report and Written Opinion of the International Search Authority dated Jan. 26, 2021 in International Application No. PCT/EP2020/079809 (English and German languages) (27 pp.).

*Primary Examiner* — Sherry L Estremsky
(74) *Attorney, Agent, or Firm* — Crowell & Moring LLP

(57) ABSTRACT

A transmission may include an input shaft, a first output shaft, a second output shaft, a first planetary gearset, and a second planetary gearset connected to the first planetary gearset. The input shaft, the first and second output shafts, and the planetary gearsets may be arranged such that a torque input via the input shaft is converted and distributed in a defined ratio to the two output shafts, and the formation of a combined torque is prevented. At least one element of the first planetary gearset may be connected to at least one element of the second planetary gearset with a shaft for conjoint rotation, and at least one element of the second planetary gearset may be fixed in place on a non-rotating component. A connector may be arranged and configured to (Continued)

passively, and therefore without a control unit and without an actuator, connect the first output shaft and second output shaft.

20 Claims, 28 Drawing Sheets

(51) Int. Cl.
  *F16H 48/26* (2006.01)
  *F16H 48/28* (2012.01)
(52) U.S. Cl.
  CPC .. *F16H 2048/104* (2013.01); *F16H 2048/106* (2013.01)

(56) References Cited

U.S. PATENT DOCUMENTS

| | | | | |
|---|---|---|---|---|
| 9,151,376 | B2* | 10/2015 | Creager | F16H 48/19 |
| 10,300,905 | B2* | 5/2019 | Holmes | F16H 48/10 |
| 11,255,419 | B2* | 2/2022 | Lindtner | F16H 48/10 |
| 2022/0203814 | A1* | 6/2022 | Reisch | B60K 17/348 |

FOREIGN PATENT DOCUMENTS

| | | | | |
|---|---|---|---|---|
| DE | 10 2008 000 444 A1 | 9/2009 | | |
| DE | 10 2008 050 059 A1 | 4/2010 | | |
| DE | 102008050059 A1 * | 4/2010 | | F16H 48/11 |
| DE | 102011102749 A1 * | 11/2012 | | B60K 1/00 |
| DE | 10 2012 202 470 B3 | 12/2012 | | |
| DE | 10 2011 079 975 A1 | 1/2013 | | |
| DE | 20 2011 110 104 U1 | 1/2013 | | |
| DE | 10 2011 085 119 B3 | 2/2013 | | |
| DE | 102013210320 A1 * | 12/2014 | | F16H 48/10 |
| DE | 102015204200 A1 * | 9/2016 | | |
| DE | 10 2015 206 139 A1 | 10/2016 | | |
| DE | 102015210932 A1 * | 12/2016 | | |
| DE | 10 2015 223 126 A1 | 5/2017 | | |
| DE | 102015223126 A1 * | 5/2017 | | F16D 13/24 |
| DE | 10 2017 124 716 A1 | 11/2018 | | |
| DE | 10 2018 112 880 A1 | 12/2018 | | |
| DE | 10 2017 212 781 A1 | 1/2019 | | |
| DE | 102017212781 A1 * | 1/2019 | | F16H 48/10 |
| WO | WO-2005120877 A1 * | 12/2005 | | B60K 17/16 |
| WO | WO-2015035995 A1 * | 3/2015 | | B60K 17/346 |

\* cited by examiner

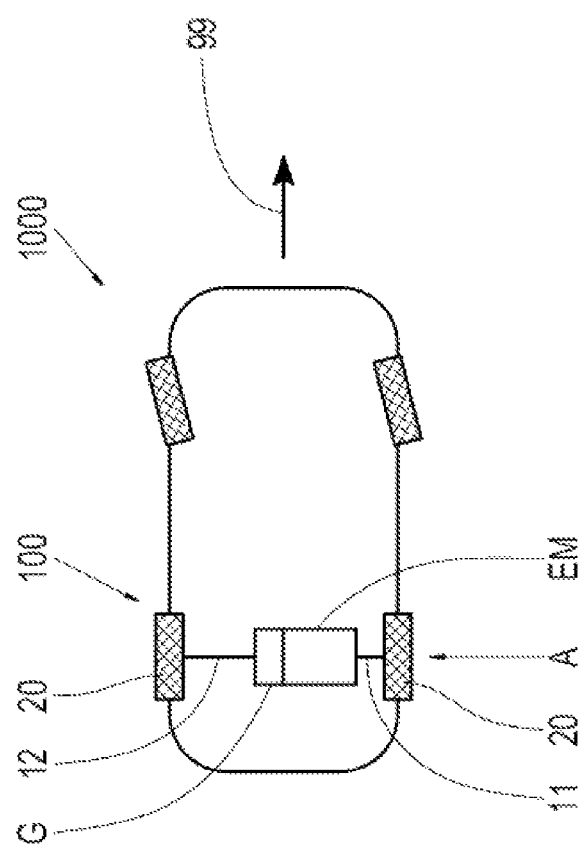

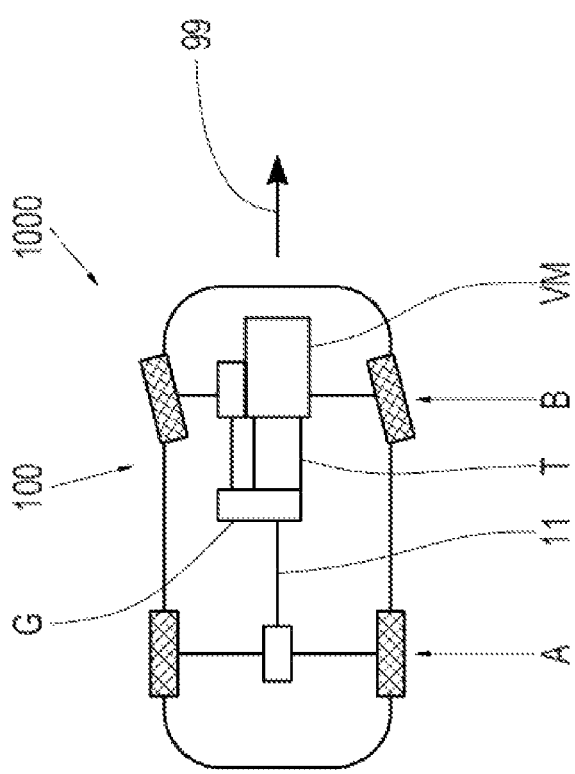

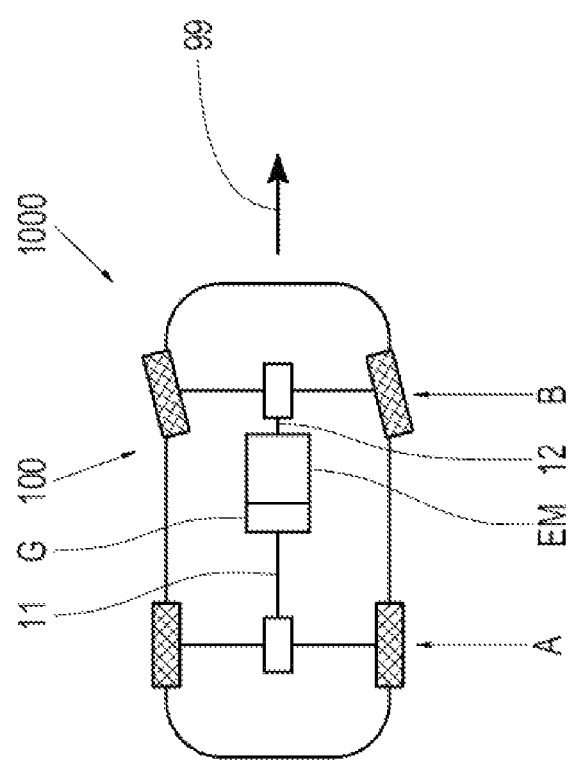

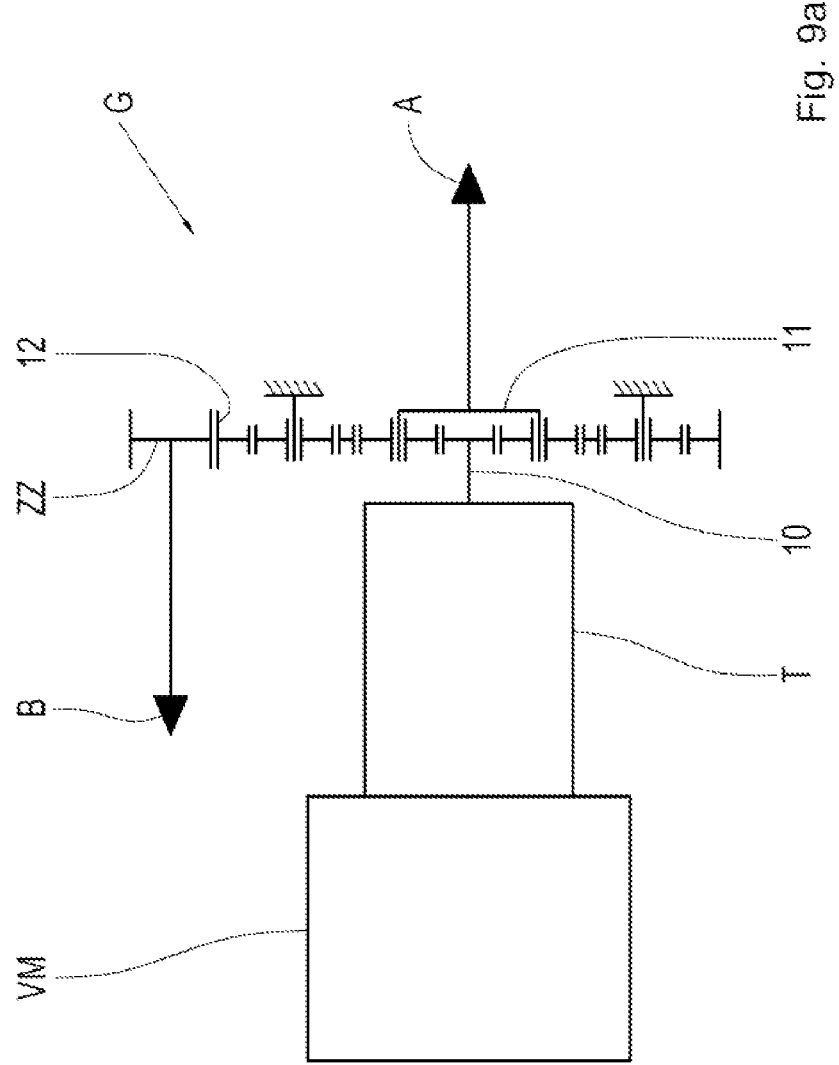

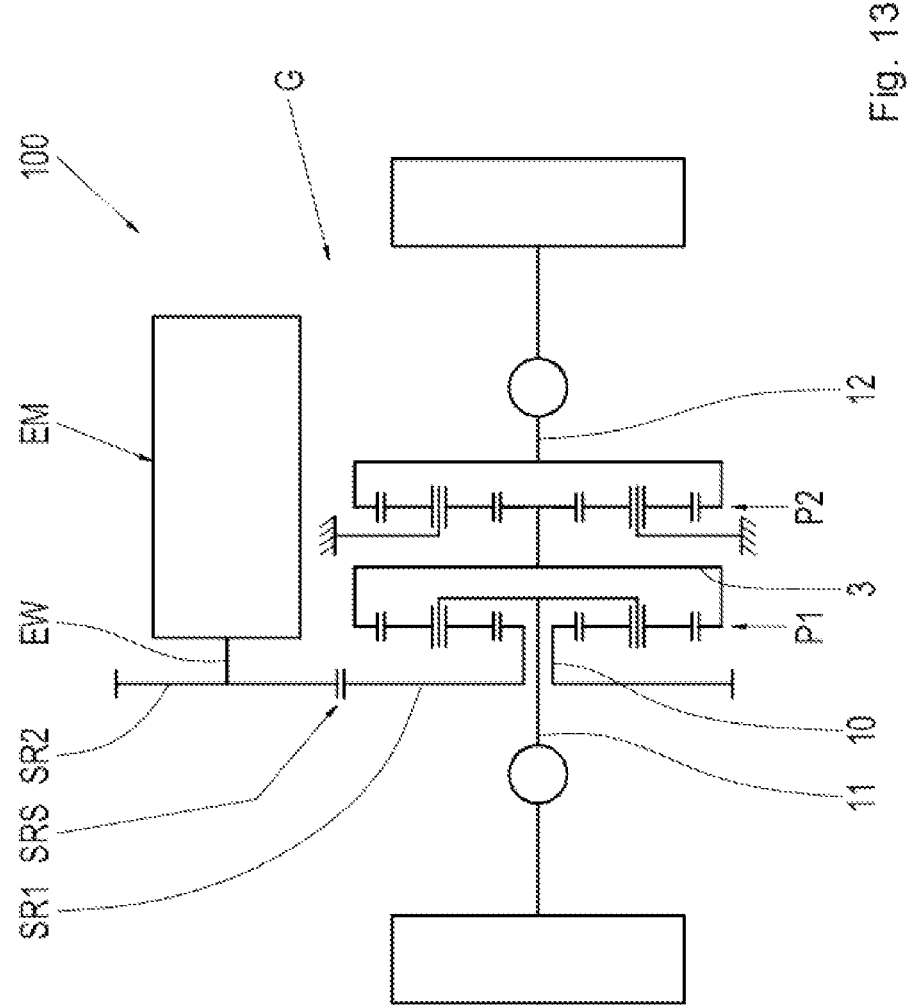

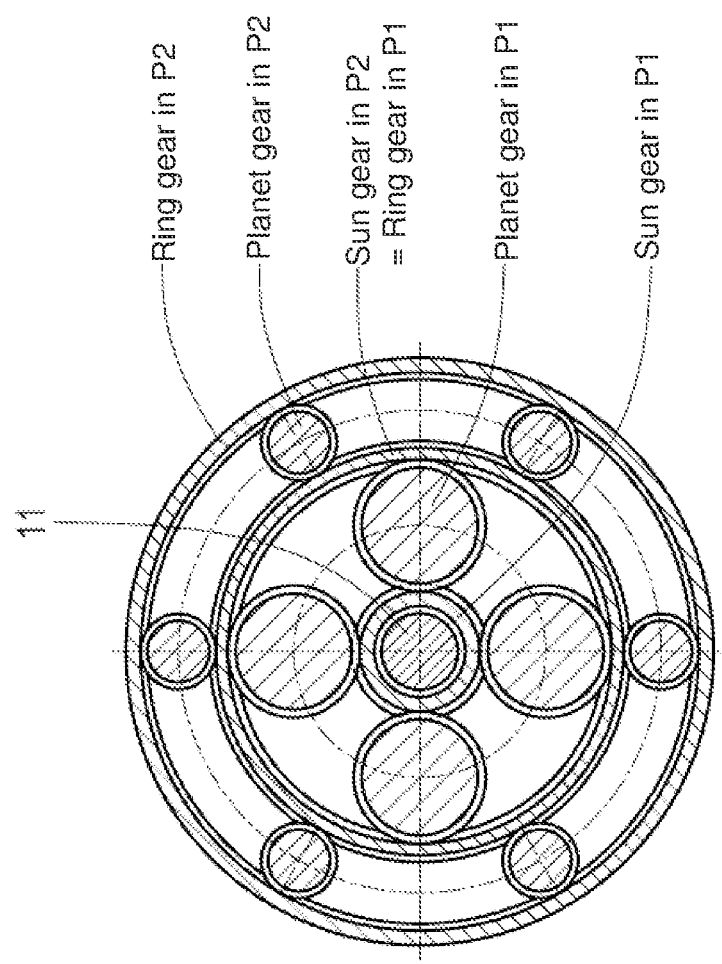

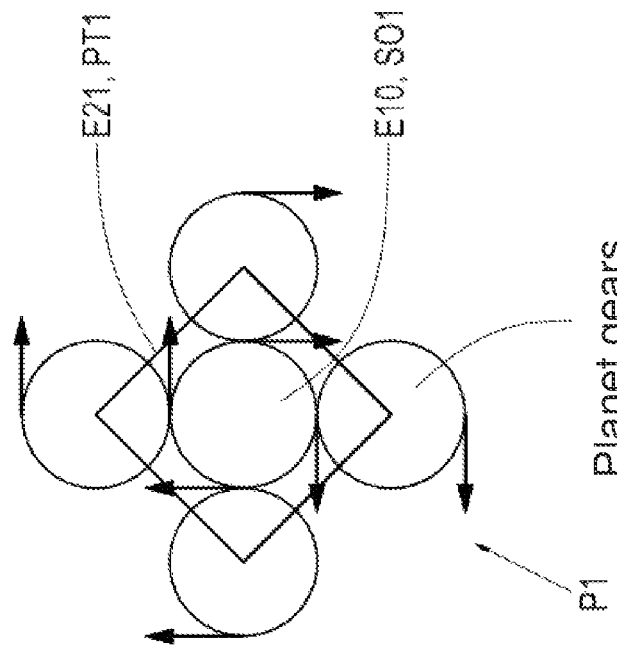
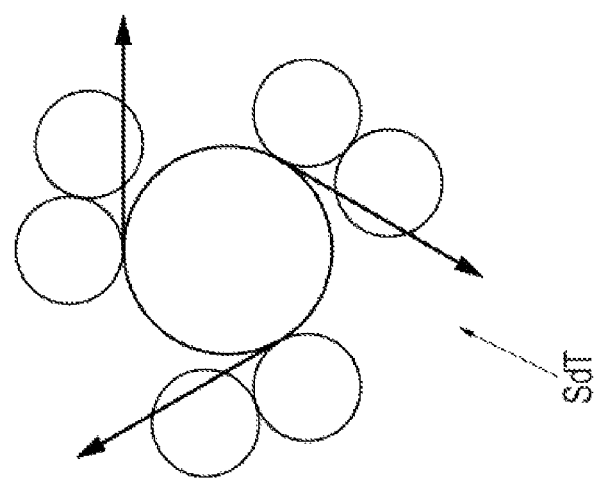

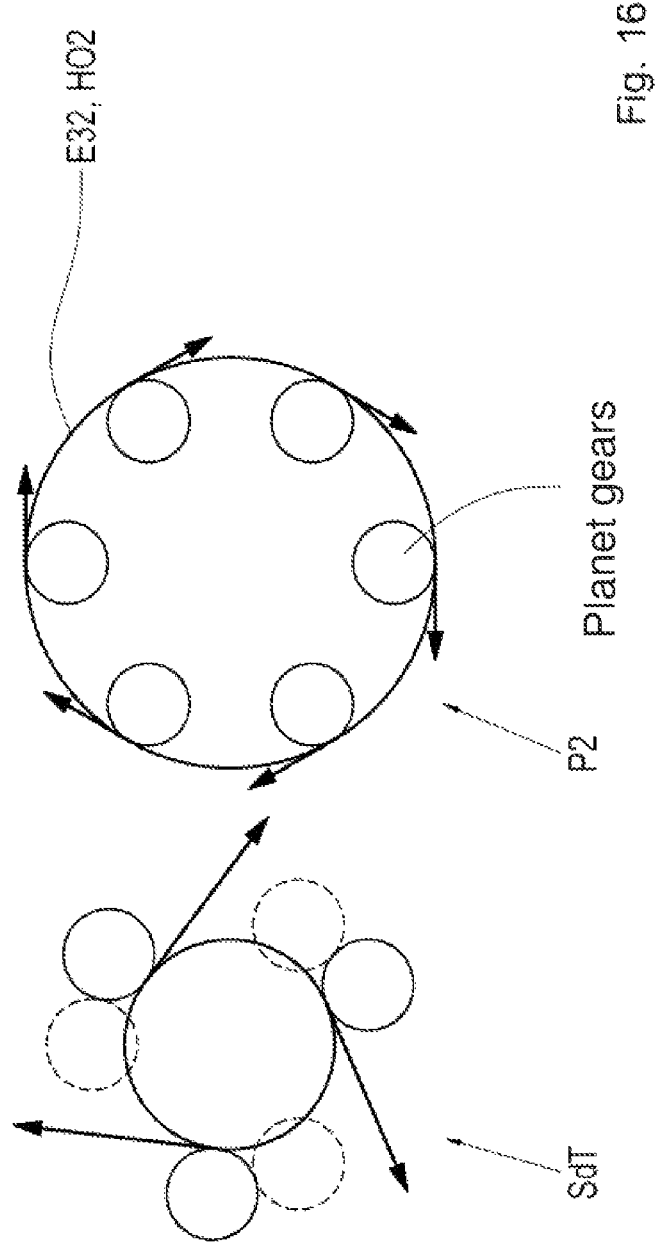

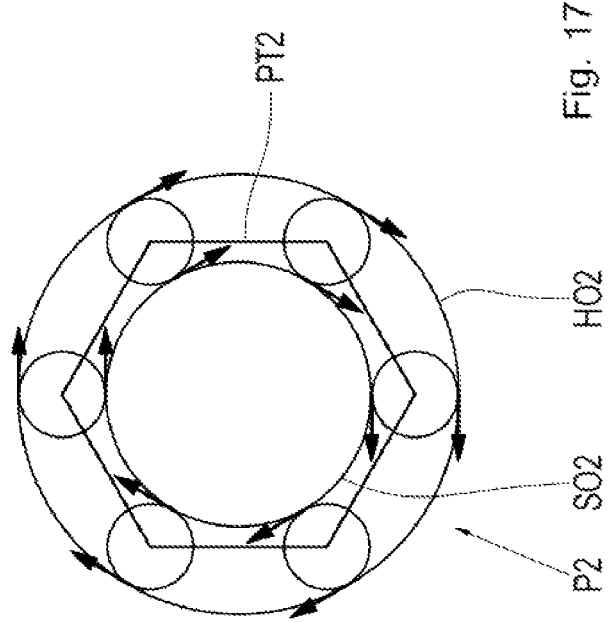
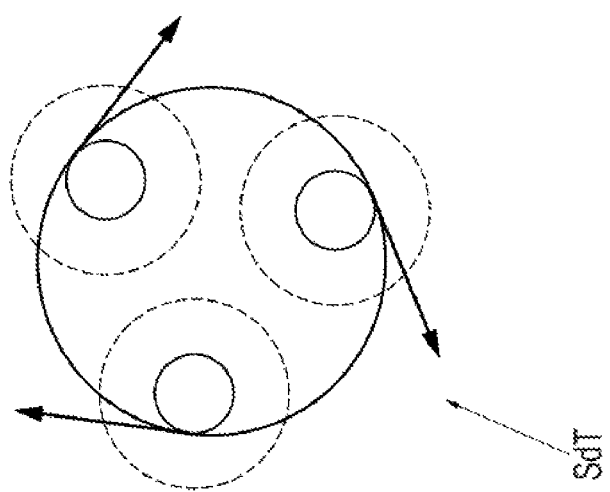
Fig. 17

| Figure | P1 | P2 | Calculating rule |
|---|---|---|---|
| 2, 3 | negative | negative | $t_{02} = \frac{1}{1-t_{01}} - 1$ |
| 8 | negative | negative | $t_{02} = \frac{1}{t_{01}} - 1$ |
| 9 | negative | negative | $t_{02} = t_{01} - 1$ |
| 4 | positive | negative | $t_{02} = \frac{1}{1-t_{01}} - 1$ |
| 6 | negative | positive | $t_{02} = 2 - \frac{1}{t_{01}}$ |
| 5 | positive | positive | $t_{02} = 2 + \frac{1}{t_{01} - 1}$ |

Fig. 19

TRANSMISSION, DRIVE TRAIN AND VEHICLE HAVING A TRANSMISSION

RELATED APPLICATION

This application is a filing under 35 U.S.C. § 371 of International Patent Application PCT/EP2020/079809, filed Oct. 22, 2020, and claiming priority to German Patent Application 10 2019 216 508.7, filed Oct. 25, 2019. All applications listed in this paragraph are hereby incorporated by reference in their entireties.

TECHNICAL FIELD

The invention relates to a transmission, in particular for a motor vehicle. The invention also relates to a drive train and a vehicle.

BACKGROUND

Transmissions are known from the prior art, e.g. DE 10 2011 079 975 A1, which provide a torque conversion as a ratio of an output torque to an input torque, and a gear ratio as a ratio of an input rotational rate to an output rotational rate.

An electric vehicle with an integrated differential is known from DE 10 2018 112 880 A1. The electric vehicle drive system contains an electric motor, first and second planetary gear assemblies, including a sun gear, planet carrier and ring gear elements, first and second output shafts, and a housing. The elements of the first planetary gear assembly are connected to the electric motor, the first output shaft, and an element in the second planetary gear assembly. The elements of the second planetary gear assembly are connected to the first planetary gear assembly, the housing, and the second output shaft. The first planetary gear assembly forms a differential reduction device, and the second planetary gear assembly forms a reversal and reduction device. Optional clutches can provide the function of a slippage limiting differential, and distribute torque to one or the other output shaft.

Such a transmission, also referred to as a rolling differential, does not form a combined torque (e.g. at a differential cage), as is otherwise typical in the prior art. The prevention of the formation of a combined torque means that the sum of the individual torques at the two output shafts is not applied to any rotating components, such as the input shaft, output shafts, or elements of the planetary gearsets.

With a bevel gear differential, the spreading effect of the bevel gears when subjected to torque is used to generate friction between the respective bevel gear and the differential cage, and obtain a desired locking effect in this manner. This effect can be enhanced by using additional friction disks. Analogously, frictional forces that are caused by gearing forces are also used in spur gear differentials to obtain a torque-dependent locking effect. The torque-dependent locking effect principle is known from DE 10 2008 000 444 A1 by the applicant, among other sources.

The locking effect of a differential can also be dependent on the rotational rate. By way of example, a rotational rate difference-dependent locking effect can also be obtained with a liquid friction clutch, a so-called viscosity clutch. The rotational rate difference between an output shaft and the differential cage is often used for this. The Viscodrive principle is known, e.g., from DE 39 12 304 A1.

Pretensioned bearing surfaces or sliding surfaces are used with both bevel gear differentials and spur gear differentials to generate a locking effect. This is known, e.g., from DE 10 2011 085 119 B3 and DE 10 2015 223 126 A1. The locking effect is independent of the rotational rate and torque in this case.

Combinations of the aforementioned locking effect principles are also frequently used.

BRIEF DESCRIPTION OF THE DRAWINGS

Certain embodiments shall be explained below are illustrated in the drawings. Therein:

FIGS. 1a-1e show a schematic illustration of a motor vehicle drive train;

FIGS. 10-13 each show a schematic illustration of a transmission as it can be used in the motor vehicle drive train shown in FIG. 1, in each case in another preferred embodiment;

FIG. 14 shows the embodiment shown in FIG. 3 in a cutaway view;

FIGS. 15-18 show a schematic illustration of the functional principle of the invention;

FIG. 19 shows an overview of the standard transmission gear ratios for the individual embodiments;

DETAILED DESCRIPTION

Figure 1B:
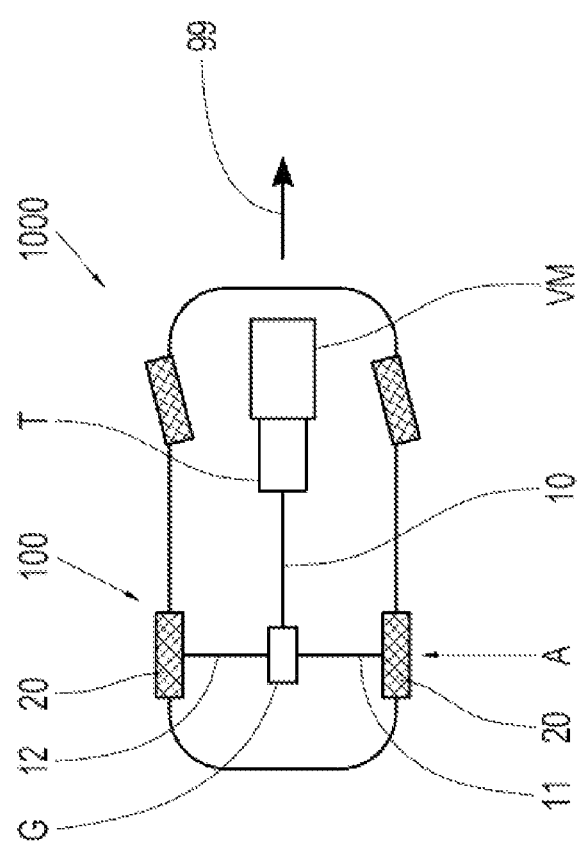

In view of the background discussed above, an object of the invention is to create a transmission, in particular in the form of an integrated differential, that enables better traction and driving behavior. It is also the object of the invention to create a drive train with such a transmission, and a motor vehicle.

The invention is based on a transmission that comprises an input shaft, a first output shaft, a second output shaft, a first planetary gearset, and a second planetary gearset connected to the first planetary gearset, wherein the planetary gearsets each comprise numerous elements, wherein a torque applied to the input shaft is converted and distributed in a defined ratio to two output shafts, and the torques are not combined, wherein at least one element of the first planetary gearset is connected to a another element of the second planetary gearset by means of a shaft for conjoint rotation therewith, and another element of the second planetary gearset is fixed in place on a non-rotating component.

The transmission is distinctive in that there is a connecting means that is arranged and designed to connect the first output shaft and the second output shaft passively, and therefore without a control device and without an actuator, such that a torque can be transferred. In other words, locking torques can be passively provided by means of the invention.

The connecting means is therefore configured to provide a connection that transfers torque between the first and second output shafts, without an actuator. This means that a locking torque can be obtained, without a control unit and actuator.

This can be a frictional connection, and therefore dependent in particular on a contact pressure. The connection can be cushioning and therefore dependent on a rotational rate difference. In the case of a frictional connection dependent on the contact pressure, the contact pressure can be kept constant, e.g. by means of pretensioning, or it can be dependent on a torque. If the contact pressure is dependent on a torque, the axial forces of a helical gearing or the torque-proportional axial force of a curved ramp system may be used.

The locking effect of the transmission is generated by a locking torque that can be load dependent and/or
rotational rate difference dependent, or
independent of the rotational rate and torque, i.e. preset.

A locking value is understood to be the quotient of the difference between the two output torques and the sum of the two torques. This means that with a locking value of 0%, both wheels have the exact same torque. With a locking value of 100%, one output transfers 100% of the torque, and the other transfers none.

The locking value S can be defined with the following formula:

$$S = \frac{|M(L) - M(R)|}{(M(L) + M(R))} = 0 \ldots 1 \text{ (or := 0\% \ldots 100\%)},$$

where M(L) is the torque at the first output shaft, and M(R) is the torque at the second output shaft.

A "shaft" as set forth in the invention is understood to be a rotating component in a transmission, via which any associated components of the transmission are connected to one another for conjoint rotation, or via which such a connection is obtained when a corresponding shifting element is actuated. The respective shaft can connect the components axially or radially, or both axially and radially, to one another. The respective shaft can therefore also be an intermediate part, via which a respective component is attached, e.g. radially.

The elements are specifically in the form of a sun gear, a planet carrier, and a ring gear.

"Axial" refers, as set forth in the present invention, to an orientation along a central longitudinal axis, along which the planetary gearsets are coaxial to one another. "Radial" is then to be understood to mean an orientation in the direction of the diameter of a shaft crossing through this central longitudinal axis.

If an element is fixed in place, it is unable to rotate. Non-rotating components of the transmission can preferably be a permanently stationary component, preferably a housing for the transmission, part of such a housing, or a component non-rotatably connected thereto.

The transmission can be designed, e.g., such that
the input shaft is connected to a first element of the first planetary gearset for conjoint rotation;
the first output shaft is connected to a second element of the first planetary gearset for conjoint rotation;
wherein a third element of the first planetary gearset is connected to a first element of the second planetary gearset for conjoint rotation;
wherein a second element of the second planetary gearset is fixed in place on a non-rotating component of the transmission;
and the second output shaft is connected to a third element of the second planetary gearset for conjoint rotation.

This results in a transmission that fulfills the functions of converting torque and distributing torque, as well as obtaining a locking effect with a single integral assembly. The invention is therefore a combined gear ratio and differential transmission, that can convert torque using a housing bracing, distribute torque to output shafts, and generate a locking force. Furthermore, the shaft that connects the first and second planetary gearset can be cost-effective, optimized in terms of installation space, and supported with low losses.

The description of the torque conversion is to be understood as follows:

The transmission has two output shafts, the combined torque of which in relation to the input torque describes the conversion of the transmission. The gear ratio for the respective output shafts is initially undefined. Defined rotational rates are first generated by coupling the two output shafts, e.g. via the vehicle wheels on a road surface. If both output shafts rotate at the same rate, as is the case when driving along a straight line, for example, the gear ratio can be formed as the ratio of the rotational rates between the input rotational rate and one of the two identical output rotational rates. In all other cases, it is not possible to refer to the gear ratio as a gear ratio of the transmission with the conventional definition.

The two planetary gearsets can be axially adjacent to one another. The first planetary gearset can also be placed radially inside the second planetary gearset. The latter case is also referred to as a nested arrangement of the planetary gearsets.

The teeth of the two elements of the first and second planetary gearsets that are connected to one another, i.e. the third element of the first planetary gearset and the first element of the second planetary gearset, are preferably formed on the same component.

A pitch of the teeth on the third element of the first planetary gearset is preferably similar to that on the first element of the second planetary gearset, preferably identical, and preferably has the same sign (+, −). Having the same value and sign, i.e. an identical pitch, results in a connecting part or coupling shaft that is not subjected to axial forces, such that there is no need for a complicated axial support. Furthermore, this makes it possible to brace the forces from the helical gearing against the connecting means according to the invention, without conducting the gearing forces over a housing support in a manner subject to losses. This bracing against the connecting means results in turn in an activation energy and provides torque information regarding the extent and direction thereof at the connecting means.

The slope or pitch of a helical gearing is understood to be the axial path measured along an associated rotational axis that is necessary to obtain a 360° encircling of the teeth about the axis along an imaginary extension of a tooth over the actual width of the gearwheel. The term "thread pitch" is used analogously in the case of a threading. A helically toothed gearwheel that has numerous teeth is therefore comparable to a multi-step threading. With spindles, the word "thread pitch" is also commonly used for this.

The input shaft is preferably connected to a drive machine, in particular an electric machine or an internal combustion engine, in order to input a torque to the transmission. In the case of an electric machine, the rotor in the electric machine is preferably connected to the input shaft for conjoint rotation. The rotor is preferably connected to the input shaft via at least one gear ratio step.

The electric machine can be either coaxial to the planetary gearsets or axially parallel thereto. In the first case, the rotor in the electric machine can be connected to the input shaft for conjoint rotation, or it can be coupled thereto via one or more intermediate gear ratio steps, wherein the latter enables a more efficient design of the electric machine, with higher rotational rates and lower torques. The at least one gear ratio step can be in the form of a spur gear step and/or planet gear step.

If instead, the electric machine is axially offset to the planetary gearsets, the coupling is obtained via one or more intermediate gear ratio steps and/or a traction drive. The one or more gear ratio steps can also be formed here individually as either spur gear steps or planetary gear steps. A traction drive can be either a belt or chain drive.

With a coaxial placement of the electric machine, the first output shaft preferably passes through the rotor of the electric machine. As a result, the transmission with an electric machine is particularly compact.

The standard transmission gear ratio for the second planetary gearset is preferably at least approximately calculated from the inverse of the standard transmission gear ratio for the planetary gearset minus 1, i.e.: $i\_02 = 1/i\_01 - 1$.

If both planetary gearsets are negative planetary gearsets (e.g. according to FIG. 2 or 3), this calculation rule results in half the output drive torque being distributed to each of the output shafts, when transmission losses are disregarded. This is advantageous in particular when the invention is used to distribute the torque to two wheels on the same axle.

If another torque distribution is desired, or the if the planetary gearsets have different designs (e.g. FIGS. 4 to 9), a calculating rule can be defined in a similar manner (FIG. 19). The term "at least approximately" is used because the asymmetrical transmission losses under real conditions when in operation may mean that a slight deviation from the calculating rule is advantageous with regard to obtaining identical output torques at both shafts. This formulation is also used because it may not be possible to precisely maintain the calculating rule when using whole number values for the numbers of teeth and beneficial tooth number combinations, e.g. with regard to acoustic requirements.

The number of planets in the second planetary gearset is preferably greater than the number of planets in the first planetary gearset. Despite use of the above calculating rule, a large transmission gear ratio can be obtained by means of this configuration, which in turn results in a particularly compact and cost-effective electric machine.

The second planetary gearset preferably has five, six, seven, or eight planets. The first planetary gearset preferably has three or four planets.

Another positive effect of the large, or larger, number of planets on the second planetary gearset is that the sun gear and/or ring gear in the second planetary gearset can be very thin, and therefore light, cost-effective, and take up less structural space.

The large, or larger, number of planets also makes it possible to conduct the gear forces to the sun gear and/or ring gear more evenly. This results in a lower elastic deformation of the sun gear or ring gear.

Furthermore, the shaft connecting the first and second planetary gearsets can be better supported by a high number of planets on the second planetary gearset. This is possible because the planet gears in the second planetary gearset are fixed in place in the housing, and the shaft in question is centered therein.

As a matter of course, the number of planet gears in the second planetary gearset can also be greater than that in the first planetary gearset when the calculating rule is not used.

The drive machine is preferably installed transverse to the direction of travel. The two output shafts are preferably connected to wheels on the vehicle for conjoint rotation.

The two output shafts preferably distribute the input torque to different axles in the vehicle. The makes it possible to obtain a longitudinal distribution transmission (also referred to as a longitudinal distributer), i.e. a transmission that distributes the input torque to numerous axles, for example, in particular a front axle and a rear axle in a vehicle.

The torque distribution to the output shafts does not need to be uniform. In particular with the embodiment as a longitudinal distribution transmission, the distribution to the two axles does not need to be uniform. By way of example, the distribution of the torque from the input shaft can be such that 60% is conducted to the rear axle, and 40% is conducted to the front axle.

The two planetary gearsets can be in the form of either a negative or positive planetary gearset. A combination of negative and positive planetary gearsets is also possible.

A negative planetary gearset is comprised in the manner known in principle to the person skilled in the art of a sun gear, planet carrier, and ring gear, wherein the planet carrier guides at least one, preferably numerous rotatably supported planet gears, each of which meshes with both the sun gear and the encompassing ring gear.

A positive planetary gearset also comprises a sun gear, ring gear, and planet carrier, wherein the latter guides at least one pair of planet gears, one of which meshes with the internal sun gear, while the other planet gear meshes with the encompassing ring gear, and the planet gears also mesh with one another.

Where it is possible to connect the individual elements, a negative planetary gearset can be replaced with a positive planetary gearset, wherein, unlike in the embodiment as a negative planetary gearset, the ring gear and the planet carrier connection are exchanged, and the value of the standard transmission gear ratio is increased by one. Conversely, a positive planetary gearset can also be replaced by a negative planetary gearset, as long as the connection of the elements in the transmission allows for this. In this case, in comparison with the positive planetary gearset, the ring gear and planet carrier connections are likewise exchanged, and a standard transmission gear ratio is reduced by one, and the sign is reversed from plus to minus. In the framework of the invention, the two planetary gearsets are each preferably in the form of negative planetary gearsets.

Both planetary gearsets are preferably designed as negative planetary gearsets. These are efficient, and can be placed axially adjacently to one another, and nested radially.

With a combination of negative and positive planetary gearsets in a nested arrangement, the radially inner planetary gearset is preferably a negative planetary gearset, and the radially outer planetary gearset is preferably a positive planetary gearset. This makes a nested arrangement easy to obtain. Furthermore, the fixed ring gear has the advantage in this context that the poorer efficiency (normally) resulting from the positive planetary gearset only affects one output shaft.

The transmission can also have an upstream step-up gearing or a multi-gear transmission, preferably a 2-gear transmission. This step-up gearing or multi-gear transmission can then also be part of the transmission, and is used to obtain an additional gear ratio in that, e.g., the rotational rate of the drive machine is translated by the transmission ratio, and the input shaft is driven with this translated rotational rate. The multi-gear transmission or step-up gearing can be in the form of a planetary transmission, in particular.

The elements of the transmission can preferably be combined as follows:
a) a transmission with two negative planetary gearsets, wherein
   the first element of the first planetary gearset is a sun gear,
   the second element of the first planetary gearset is a planet carrier, and
   the third element of the first planetary gearset is a ring gear,
   and wherein
   the first element of the second planetary gearset is a sun gear,
   the second element of the second planetary gearset is a planet carrier, and
   the third element of the second planetary gearset is a ring gear.
   This transmission can be referred to as a first concept with two negative planetary gearsets.
b) a transmission with two negative planetary gearsets, wherein
   the first element of the first planetary gearset is a sun gear,
   the second element of the first planetary gearset is a ring gear, and
   the third element of the first planetary gearset is a planet carrier,
   and wherein
   the first element of the second planetary gearset is a ring gear,
   the second element of the second planetary gearset is a planet carrier, and
   the third element of the second planetary gearset is a sun gear.
   This transmission can be referred to as a second concept with two negative planetary gearsets.
c) a transmission with two negative planetary gearsets, wherein
   the first element of the first planetary gearset is a ring gear,
   the second element of the first planetary gearset is a planet carrier, and
   the third element of the first planetary gearset is a sun gear,
   and wherein
   the first element of the second planetary gearset is a sun gear,
   the second element of the second planetary gearset is a planet carrier, and
   the third element of the second planetary gearset is a ring gear.
   This transmission can be referred to as a fifth concept with two negative planetary gearsets.
d) a transmission with a positive and a negative planetary gearset, wherein the second planetary gearset is the negative planetary gearset, wherein
   the first element of the first planetary gearset is a sun gear,
   the second element of the first planetary gearset is a ring gear, and
   the third element of the first planetary gearset is a planet carrier,
   and wherein
   the first element of the second planetary gearset is a sun gear,
   the second element of the second planetary gearset is a planet carrier, and
   the third element of the second planetary gearset is a ring gear.
   This transmission is basically the first concept, with a positive planetary gearset.
e) a transmission with a positive and a negative planetary gearset, wherein the first planetary gearset is the negative planetary gearset, wherein
   the first element of the first planetary gearset is a sun gear,
   the second element of the first planetary gearset is a planet carrier, and
   the third element of the first planetary gearset is a ring gear,
   and wherein
   the first element of the second planetary gearset is a sun gear,
   the second element of the second planetary gearset (P2) is a ring gear, and
   the third element of the second planetary gearset is a planet carrier.
   This transmission is basically the first concept, with a positive planetary gearset.
f) a transmission with two positive planetary gearsets, wherein
   the first element of the first planetary gearset is a sun gear,
   the second element of the first planetary gearset is a ring gear, and
   the third element of the first planetary gearset is a planet carrier,
   and wherein
   the first element of the second planetary gearset is a sun gear,
   the second element of the second planetary gearset is a ring gear, and
   the third element of the second planetary gearset is a planet carrier.
   This transmission is basically the first concept, with two positive planetary gearsets.

The connecting means in the transmission preferably has friction surfaces, such that a connection can be obtained by means of frictional forces. This means that there are at least two corresponding friction surfaces between the two output shafts. The connecting means can be a multi-disk clutch in particular.

The friction surfaces in the multi-disk clutch can be flat or conical, although the conical design results in a higher friction torque with the same amount of friction surface.

A transmission is preferred in which a friction element in the form of a friction disk or friction cone, or a component adjacent to the friction cone, is placed and designed such that an axial play of the second element of the first planetary gearset, and/or the third element of the second planetary gearset, and/or the input shaft, can be adjusted. This means that the axial play of one of these three elements, two of the elements, or three of these elements can be adjusted.

A transmission is preferred in which at least one of the friction surfaces is a component of the second element in the first planetary gearset, or the third element of the second planetary gearset. This reduces the number of parts, and consequently the costs. These elements are preferably relatively large, heavy, and well attached thermally, such that in this case, the heat generated in the friction element can also be readily stored and/or dissipated.

A transmission is preferred in which at least one of the friction surfaces is located on a component that conducts the output torque to one of the two output shafts. This also reduces the number of parts, by means of which costs can also be lowered. Furthermore, the same thermal advantages can be obtained.

A transmission is preferred in which
the input shaft and/or
the first element of the first planetary gearset, and/or
the second element of the first planetary gearset, and/or
the third element of the second planetary gearset
is supported in a floating manner.

It is particularly preferred when the input shaft and the first element of the first planetary gearset are supported in a floating manner. It is likewise preferred when the second element of the first planetary gearset and the third element of the second planetary gearset are supported in a floating manner.

A floating bearing has a few tenths of a millimeter play in the axial direction, i.e. the shaft in question is not clearly fixed in place or secured in the axial direction. This makes it possible to easily conduct the gearing forces toward the friction element. Furthermore, floating bearings are cost-effective, are not particularly complicated, and allow for an expansion of the shaft where there is play, e.g. caused by temperature changes.

A transmission is preferred in which the contact pressure of the friction surfaces is obtained by a constant contact pressure.

A transmission is preferred in which the constant contact pressure is caused by means of a pretensioned spring. This means that torques that can be transferred between the two output shafts are caused by means of a pretensioning of friction elements. The pretensioned spring can be designed, e.g., as a slotted plate spring, or an undular washer.

A transmission in preferred in which the friction surfaces that are pretensioned by a spring are also subjected to axial forces from a helical gearing on the first element of the first planetary gearset and/or the third element on the second planetary gearset. The also makes it possible to obtain a torque-dependent locking effect with the same friction elements by means of the constant locking effect caused by the spring.

The friction element in the form of a friction plate or friction cone is preferably wave-shaped. With a wave-shaped design, a pretensioning is obtained that acts on the friction surface. A fundamental locking torque can be obtained in this manner.

A fundamental locking torque is understood to be a locking torque that is substantially independent of a torque that is transferred and independent of the present difference in rotational rates.

A transmission is preferred in which the contact pressure of the friction surfaces is caused by a torque-dependent contact pressure. The contact pressure that transfers the torque between the two output shafts is obtained from a torque acting on the drive shaft or one of the two output shafts.

A transmission is preferred in which the contact pressure is obtained by means of a helical gearing, wherein the sign (+, −) of the angle of the helix is selected such that in the forward traction mode, (and consequently also in the reverse pushing mode) the first element in the first planetary gearset and the third element in the second planetary gearset act counter to one another. This results in a bearing point, e.g. at a friction element, between the two output shafts, with a contact pressure proportional to the torque.

One disadvantage of the otherwise advantageous solutions that have been selected so far is that the potential axial force is limited to the force of the gearing. Although it would be possible to increase the pitch angle, there are other criteria in the design of the gearing that also must be taken into account. Furthermore, the force is normally conducted into an axial bearing, which is normally subjected to losses. Moreover, the use of the axial force from the gearing only functions with one sign (+, −) for the torque, i.e. in the traction mode in the present case.

This disadvantage is overcome in that the contact pressure is caused by means of a curved ramp. This means that a torque is conducted over a curved ramp, and the contact pressure for the friction element is generated in this manner.

The curved ramp can be placed in particular between
the third element of the second planetary gearset and the second output shaft, or
the second element of the first planetary gearset and the first output shaft, or
the input shaft and the first element of the first planetary gearset.

A curved ramp has a torque input and a coaxial torque output. The transfer therebetween follows a curve, such that both the input and output are subject to a spreading force in the axial direction when torque is transferred, that is proportional to the torque. These curved ramps are used in particular in continuously variable transmissions as torque-dependent pressure mechanisms. The curved ramp can have rollers, e.g. spherical, cylindrical, or conical rollers. The spreading effect of the curved ramp functions in both the traction mode and pushing mode, unlike with a spindle drive.

It is preferred when the contact pressure of the friction surfaces is caused by means of rotational rate difference-dependent contact pressure. A hydraulic pump is operated with the difference in the rotational rates between the two output shafts, for example, which then actuates the friction clutch via a hydraulic cylinder.

A transmission is preferred in which the connecting means is a liquid friction clutch. A cushioning liquid friction clutch acts between the two output shafts, also referred to as a viscosity clutch. The locking torque increases in this variation as the rotational rate difference increases. Consequently, a rotational rate difference is also the cause here for a torque that can be transferred between the two output shafts.

In summary, it can be established that the connecting means can be controlled in a passive manner in a number of ways, specifically by means of
axial forces in the helical gearing, or
a pretensioned force, or
a torque in a ramp, or
a rotational rate difference between the two output shafts.

The transmission is part of a motor vehicle drive train for a hybrid or electric vehicle in particular, and is then located between a drive machine in the form of an internal combustion engine or an electric machine in the motor vehicle and the subsequent components of the drive train in the direction of the force flow to the drive wheels of the motor vehicle. The input shaft of the transmission is then preferably coupled with a crankshaft of the internal combustion engine or the rotor shaft of the electric machine. The transmission can also be part of a drive train for a conventional motor vehicle, i.e. a vehicle that is powered by only an internal combustion engine.

That two components of the transmission are "connected" or "coupled," or "connected to one another" for conjoint rotation means, as set forth in the invention, that these components are coupled in a fixed manner, such that they cannot rotate independently from one another. In this regard, there is no shifting element between these components, which may be elements in the planetary gearsets and/or shafts and/or a non-rotating component of the transmission, and instead, the components in question are permanently coupled to one another. A rotationally flexible connection between two components for conjoint rotation is also understood to be a conjoint rotational connection. In particular, a connection for conjoint rotation can also contain joints, e.g. for enabling a steering movement or spring deflection of a wheel.

According to another aspect of the invention, a drive train for a vehicle is provided, which comprises a transmission that has the features described above. The advantages of the transmission also apply to a drive train with such a transmission.

According to another aspect of the invention, a vehicle is provided, which has a drive train comprising a transmission that has the features described above. The advantages of the transmission also apply to a vehicle that has such a transmission.

On the whole, a transmission and a vehicle comprising such a transmission can be provided by the invention, which has an integral construction, i.e. a torque conversion and torque distribution as well as a compact and axially short construction (in particular with a nested assembly). Furthermore, the transmission is distinguished by high efficiency and low costs as a result of reduced complexity. There are significantly lower gearing forces. Furthermore, the problems caused by grinding the gears are reduced. Furthermore, it also exhibits an extremely low locking value. Moreover, a constructive locking value can be selected freely, without the need for an actuator.igs. 1a to 1e each show a schematic illustration of a transmission G for a motor vehicle drive train 100 in a vehicle 1000 in the form of a passenger automobile.

The drive train 100 according to FIG. 1a has an electric drive that powers the rear axle A of the vehicle 1000. The drive train comprises a transmission G that distributes the drive torque from the electric machine EM to two output shafts 11 and 12. The transmission G and the electric machine are located in the same housing. The forward direction of travel is indicated by the arrow 99. As can also be seen in FIG. 1a, the transmission G and the electric machine EM are oriented transverse to the vehicle's direction of travel.

The drive train 100 according to FIG. 1b has an internal combustion engine drive that powers the rear axle A of the vehicle 1000. The drive train comprises a transmission G, which distributes the drive torque from the internal combustion engine VM to two output shafts 11 and 12, wherein there is another transmission, e.g. an automatic transmission for the vehicle, located between the transmission G and the internal combustion engine VM. The forward direction of travel is indicated by the arrow 99. As can also be seen in FIG. 1b, the transmission G and the internal combustion engine VM are oriented longitudinally in relation to the vehicle's direction of travel.

The drive train 100 according to FIG. 1c has an internal combustion engine drive that powers the rear axle A and the front axle B of the vehicle 1000. The drive train comprises a transmission G, which distributes the drive torque from the internal combustion engine VM to the axles A and B, wherein there is another transmission, e.g. an automatic transmission, for the vehicle, located between the transmission G and the internal combustion engine VM. The transmission G can then be connected to an axle differential for the rear axle A via an output shaft 11 and to an axle differential for the front axle B via an output shaft 12. The forward direction of travel is indicated by the arrow 99. As can also be seen in FIG. 1c, the transmission G and the internal combustion engine VM are oriented longitudinally in relation to the vehicle's direction of travel.

Figure 1D:
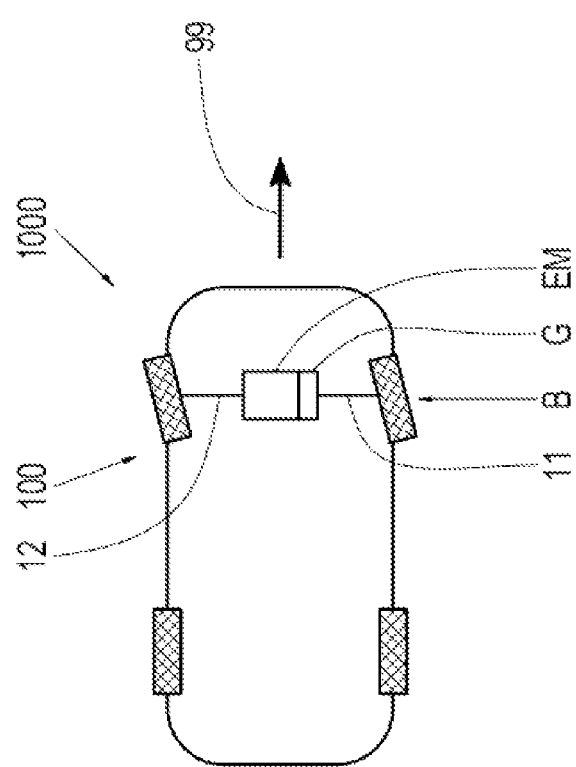

The drive train 100 according to FIG. 1d has an electric drive that powers the front axle B of the vehicle 1000, i.e. an electric front-transverse drive. The drive train comprises a transmission G, which distributes the drive torque from the electric machine EM to two output shafts 11 and 12. The transmission G and the electric machine are located in the same housing. The forward direction of travel is indicated by the arrow 99. As can also be seen in FIG. 1d, the transmission G and the electric machine EM are transverse to the vehicle's direction of travel.

The drive train 100 according to FIG. 1e has an electric all-wheel drive that powers both the rear axle A and the front axle B of the vehicle 1000. This is a transmission designed as a longitudinal distributer. The drive train comprises a transmission G, which distributes the drive torque from the electric machine EM to two output shafts 11 and 12. The output shaft 11 transfers the torque to the front axle B, while the output shaft 12 transfers the torque to the rear axle A. The respective torques are then input to the respective axle differentials. The transmission G and the electric machine are located in the same housing. The forward direction of travel is indicated by the arrow 99. As can also be seen in FIG. 1e, the transmission G and the electric machine EM are oriented transverse to the vehicle's direction of travel.

Figure 2:
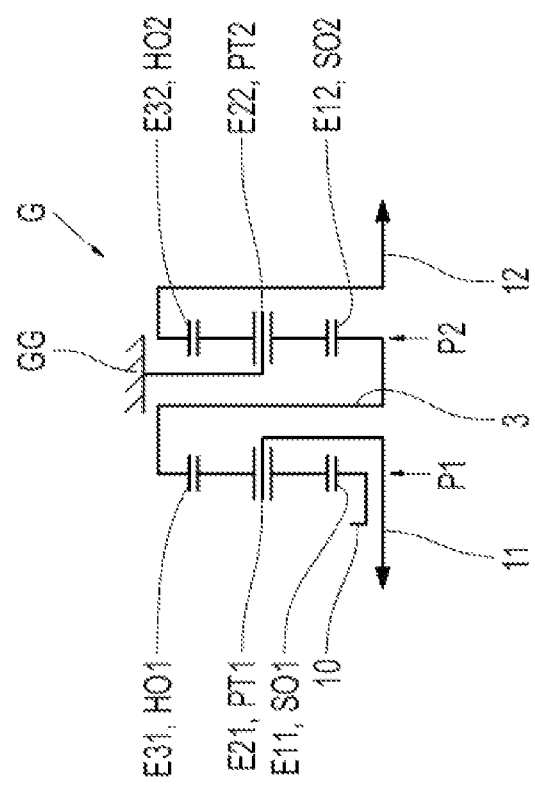
FIGS. 2-5 each show a schematic illustration of a transmission as it can be used in the motor vehicle drive train shown in FIG. 1, in each case in a preferred embodiment.

FIG. 2 shows a transmission G in a first preferred embodiment. The transmission G comprises an input shaft 10, a first output shaft 11, a second output shaft 12, a first planetary gearset P1 and a second planetary gearset P2, connected to the first planetary gearset P1. The planetary gearsets P1 and P2 are each designed as negative planetary gearsets in the present case. The planetary gearsets P1, P2 each comprise numerous elements E11, E21, E31, E12, E22, E32, wherein the first element E11 is a sun gear SO1, the second element E21 is a planet carrier PT1, and the third element E31 of the first planetary gearset P1 is a ring gear HO1. In the second planetary gearset P2, the first element E12 is a sun gear SO2, the second element E22 is a planet carrier PT2, and the third element E32 is a ring gear HO2. The planet gear carriers PT1, PT2 each support numerous planetary gears, which are illustrated but not given reference symbols. The planet gears mesh with the respective, radially inner sun gear and with the respective encompassing ring gear.

The input shaft 10 in the present case is connected to the first element E11 for conjoint rotation. The first output shaft 11 is connected to the second element E21 of the first planetary gearset for conjoint rotation. The second output shaft 12 is connected to the third element E32 of the second planetary gearset for conjoint rotation. The third element E31 of the first planetary gearset P1 is connected to the first element E12 of the second planetary gearset P2 for conjoint rotation, while the second element E22 of the second planetary gearset P2 is attached permanently to a non-rotation component GG. The non-rotating component GG is a transmission housing for the transmission G.

The third element E31, i.e. the ring gear HO1 of the first planetary gearset P12 and the first element E12, i.e. the sun gear SO2 of the second planetary gearset, form a common component, which in the present case is a shaft 3.

As can be seen in FIG. 2, the input shaft 10, first output shaft 11, and second output shaft 12, are coaxial to one another. The two planetary gearsets P1, P2 are also coaxial to one another. The two planetary gearsets P1, P2 are also axially spaced apart in this embodiment.

The input shaft 10 can be connected to a drive machine, and thus input an input torque to the transmission G. This means that the input shaft and output shafts all turn in the same direction. By connecting the two planetary gearsets P1, P2 to one another, and bracing the second element E22 against the housing GG, the input torque can be distributed to the two output shafts 11, 12. In this case, the transmission assumes not only the function of a step-up gearing, but also that of a differential transmission. This means that the input torque is not only translated by a transmission ratio, but is also distributed to different output shafts. The direction of rotation is not reversed in this embodiment.

Figure 3:
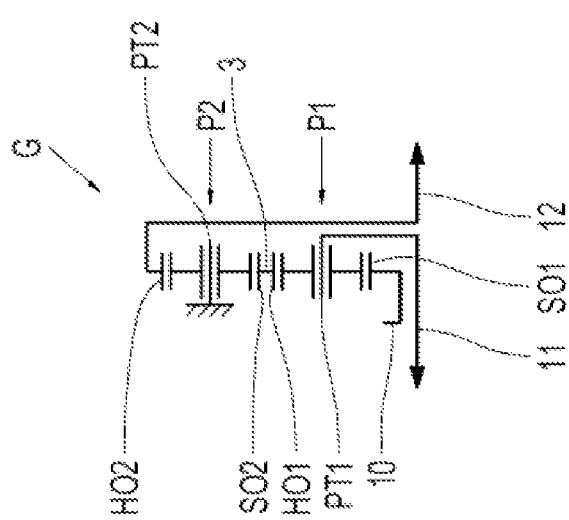

FIG. 3 shows another preferred embodiment of the transmission G. Unlike the embodiment shown in FIG. 2, the embodiment in FIG. 3 has a radially nested arrangement of the two planetary gearsets P1, P2. While the embodiment according to FIG. 2 proposes a extremely compact radial structural solution, the embodiment according to FIG. 3 enables an extremely compact axial structural transmission G. The first planetary gearset P1 forms the radially inner planetary gearset in this case. The second planetary gearset P2 forms the radially outer planetary gearset. The first planetary gearset P1 is therefore radially inside the second planetary gearset P2. The connection if the first ring gear HO1 in the first planetary gearset P1 to the sun gear SO2 in the second planetary gearset in this embodiment also forms a single component, which in the present case is also a shaft 3. There is also no reversal of the direction of rotation in this embodiment.

Figure 4:
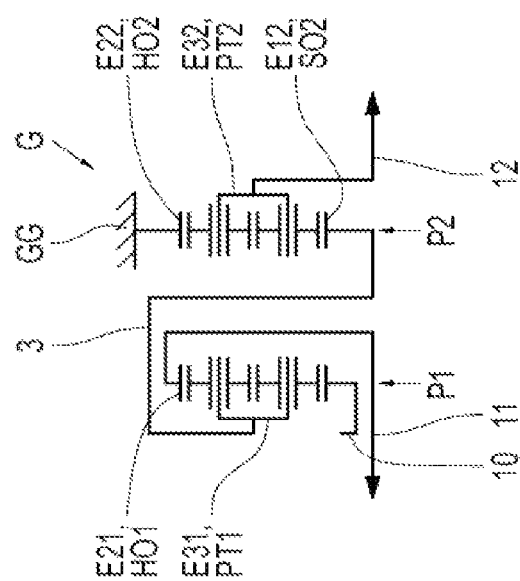

FIG. 4 shows a transmission G in another preferred embodiment. The difference to FIG. 2 is that the first planetary gearset P1 is now designed as a positive planetary gearset. This means that the third element E31 in the first planetary gearset is designed as a planet gear carrier, which is connected to the first element E12 of the second planetary gearset, i.e. the sun gear SO2, for conjoint rotation. The second element E21 is then designed as a ring gear HO1, and connected to the first output shaft 11 for conjoint rotation. The third element E31 of the first planetary gearset and the first element E12 of the second planetary gearset are then formed on the same component, which is a shaft 3 in the present case. For all other details, reference is made to the explanations regarding FIG. 2.

Figure 5:
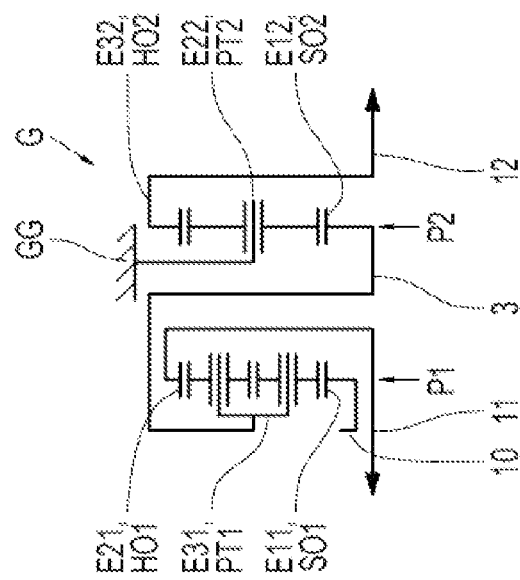

FIG. 5 shows another preferred embodiment of the transmission G. Unlike the embodiment in FIG. 2, both planetary gearsets P1, P2 now form positive planetary gearsets. The second element E21 is therefore in the form of a ring gear HO1, and connected to the first output shaft 11 for conjoint rotation. The third element E31 is then in the form of a planet carrier PT1, and connected to the first element E12, i.e. the sun gear SO2 of the second planetary gearset P2, for conjoint rotation. The second element E22 in the second planetary gearset P2 is then in the form of the ring gear HO2, and fixed in place on the non-rotating component GG. The third element E32 of the second planetary gearset P2 is in the form of a planet carrier PT2, and connected to the second output shaft 12 for conjoint rotation.

The planet carrier and ring gear connections are therefore exchanged in both planetary gearsets P1, P2. For all other details, reference is made to the explanations regarding FIG. 2.

Figure 6:
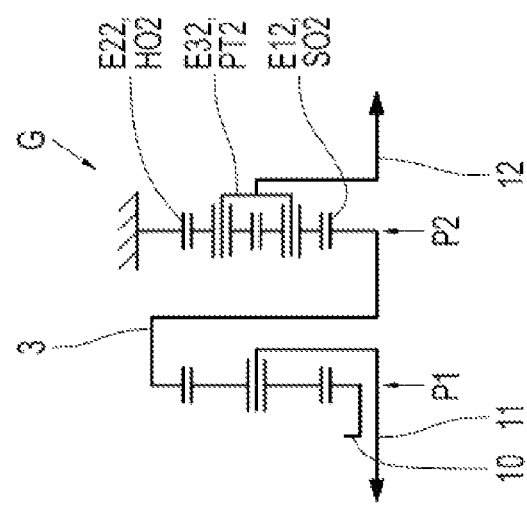
FIG. 6 shows a schematic illustration of a transmission as it can be used in the motor vehicle drive train shown in FIG. 1, in another preferred embodiment.

FIG. 6 shows a transmission in another preferred embodiment. Unlike the embodiment in FIG. 2, the second planetary gearset P2 is then in the form of a positive planetary gearset, while the first planetary gearset P1 remains unchanged. The ring gear HO2 of the second planetary gearset P2 is therefore fixed in place on the housing GG. Furthermore, the planet carrier PT2 is connected to the second output shaft 12 for conjoint rotation. The planet carrier and ring gear connections in the second planetary gearset are therefore exchanged. For all other details, reference is made to the explanations regarding FIG. 2.

Figure 7:
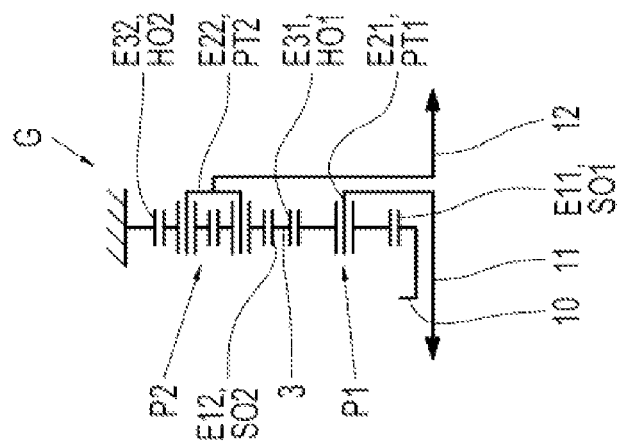
FIGS. 7-9 each show a schematic illustration of a transmission as it can be used in the motor vehicle drive train shown in FIG. 1, in each case in another preferred embodiment.

FIG. 7 shows another preferred embodiment of the transmission G. Unlike the embodiment in FIG. 6, the embodiment in FIG. 7 has radially nested planetary gearsets P1, P2. The radially inner planetary gearset is the first planetary gearset P1. The radially outer planetary gearset is the second planetary gearset. For all other details, reference is made to the explanations regarding FIGS. 6 and 2.

Figure 8:
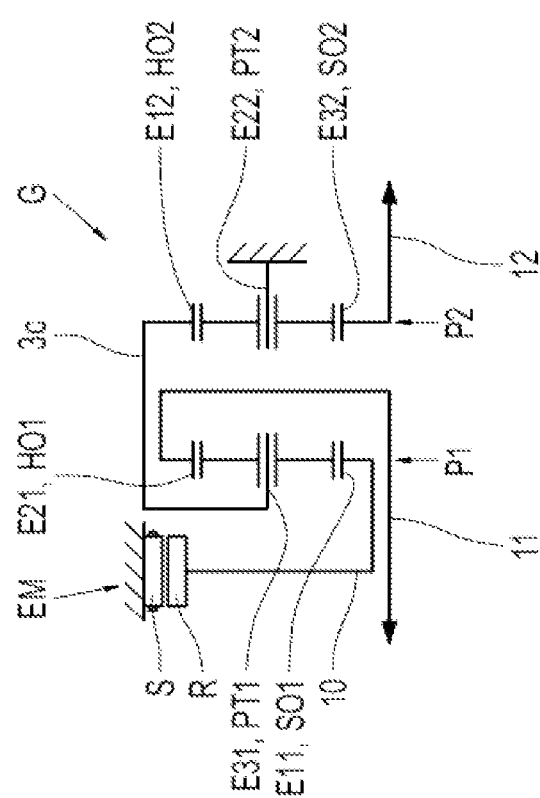

FIG. 8 shows the transmission G in another preferred embodiment. This embodiment exhibits the following differences to the embodiment in FIG. 2. First, there is a drive machine in the form of an electric machine EM. The electric machine EM comprises a stator S and a rotor R in a housing. The rotor R for the electric machine EM is connected to the first element E11, i.e. the sun gear SO1 in the first planetary gearset, for conjoint rotation. A further difference is that the second element E21 in the first planetary gearset is in the form of a ring gear HO1, and connected to the first output shaft 11 for conjoint rotation. Furthermore, the third element E31 in the first planetary gearset P1 is in the form of a planet carrier PT1, and is connected to the first element E12 of the second planetary gearset P2, which is in the form of a ring gear HO2 in the present case, for conjoint rotation. The second element E22 of the second planetary gearset is still in the form of a planet carrier PT2, and fixed in place on the housing GG. The third element E32 is then in the form of a sun gear SO2, and connected to the second output shaft for conjoint rotation. In this preferred embodiment, the input rotation is reversed. It is not possible to nest the planetary gearsets P1, P2 in this embodiment.

In other words, the torque is still input via the sun gear SO1 in the first planetary gearset P1, while the output is obtained via the ring gear HO1. Unlike in FIG. 2, the planet carrier in the first planetary gearset P1 is then connected to the ring gear HO2 of the second planetary gearset for conjoint rotation. Unlike the embodiment in FIG. 2, the output of the second planetary gearset then takes place via the sun gear SO2.

Figure 9:
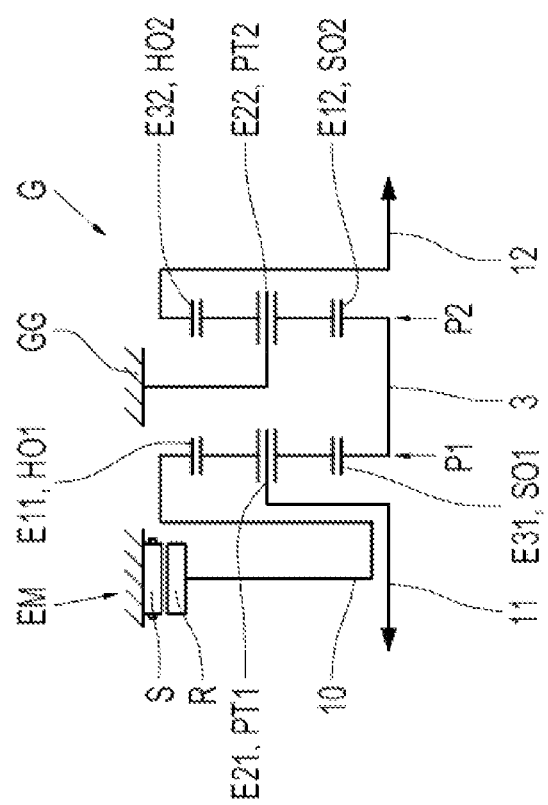

FIG. 9 shows another preferred embodiment of the transmission G. The embodiment exhibits the following differences to the embodiment in FIG. 2. First, there is a drive machine in the form of an electric machine EM, which has a stator S and a rotor R in a housing. The rotor R is connected to the input shaft 10 for conjoint rotation, which in turn is connected to the first element E11, a ring gear HO1 in the present case, in the first planetary gearset P1. The first output shaft 11 is connected to the second element E21, in the form of a planet carrier PT2 in the preset case, in the first planetary gearset P1. The third element E31 in the first planetary gearset P1, in the form of a sun gear SO1 in the present case, is connected to the first element E12, i.e. the sun gear SO2 in the second planetary gearset P2, for conjoint rotation. The other elements in the second planetary gearset remain unchanged.

Unlike in the embodiment in FIG. 2, the torque is input in the embodiment in FIG. 9 via the ring gear HO1 in the first planetary gearset P1, while the output of the first planetary gearset P1 continues to take place via the planet carrier PT1. Unlike in FIG. 2, the two planetary gearsets P1, P2 are connected via a shared sun gear, which is in the form of a shaft 3 in the present case.

FIG. 9a shows a concrete embodiment of the transmission G for the drive train in FIG. 1c. The output shaft 12 transfers the torque to the rear axle A. The output shaft 11 transfers the torque to the front axle B. As can be readily seen, the axes of the output shafts 11, 12 are parallel to one another, and not coaxial to one another. The second output shaft 12 in the second planetary gearset P2 meshes with the intermediate gearwheel ZZ, which is connected in turn to a shaft, which then inputs the torque to a rear axle differential, not shown.

Figure 10:
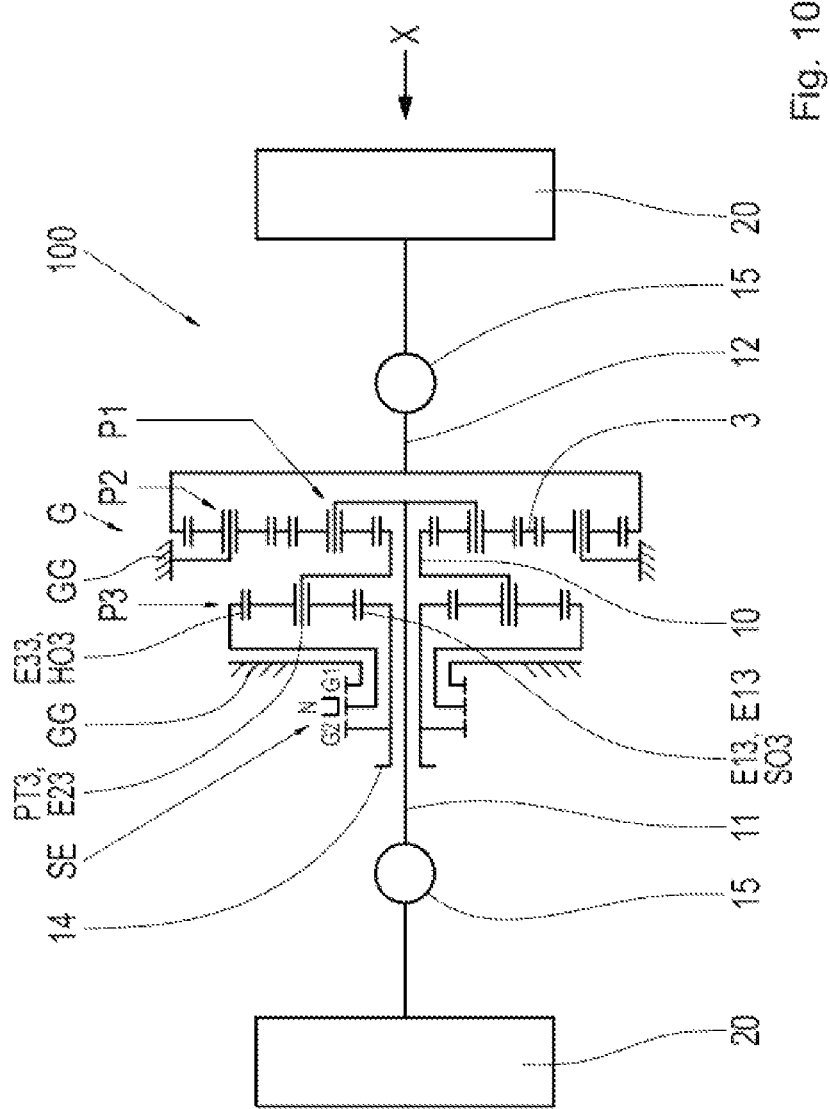

FIG. 10 shows a drive train 100 for a vehicle that has a transmission in a preferred embodiment, wherein the transmission G also has an upstream step-up gearing in the form of a planetary gearing P3.

The transmission G is the embodiment shown in FIG. 3, to which reference is made here. The planetary gearset P3 is in the form of a negative planetary gearset, and has a first element E13 in the form of a sun gear, a second element E23 in the form of a planet carrier, and a third element E33 in the form of a ring gear. The second element E23 in the third planetary gearset is connected to the input shaft 10 of the transmission G for conjoint rotation.

A shifting element is also assigned to the planetary gearing P3. The shifting element SE is designed to fix the third element E33 in place on the non-rotating component GG. The shifting element SE is also designed to connect the third element E33 to the first element E13 in the third planetary gearset, when in a second shifting position, i.e. to block it. If a planetary gearset is "blocked," the transmission ratio is always 1, regardless of the number of teeth. In other words, the planetary gearset rotates as a block. In a third shifting position, the third element E33 is neither fixed in place on the housing, nor is the planetary gearset P3 blocked. The shifting element SE is in a neutral position in this case. The first shifting position of the shifting element SE is indicated by the reference symbol G1, which also represents a first gear step. The second shifting position is indicated with the reference symbol G2, which also represents second gear step. The first element E13 in the planetary gearset P3 is connected to a drive machine, not shown, via an input shaft 14. If the shifting element SE is in the neutral setting, the drive torque input to the step-up gearing P3 is not transferred to the input shaft 10 for the transmission G.

As can also be readily derived from FIG. 10, the step-up gearing P3 is coaxial to the input shaft 10 and the output shafts 11, 12. It can also be readily seen how the first output shaft 11 passes through the input shaft 10 in the form of a hollow shaft, and also through the other shaft 14 in the form of a hollow shaft. The two output shafts 11, 12 are each connected to a drive gear 20. There are universal joints 15, which enable wheel movements such as steering movements and/or spring deflections. The shifting element SE is shown here as a form-fitting double-shifting element. Single-shifting elements, in particular powershift elements, are also conceivable.

Figure 11:
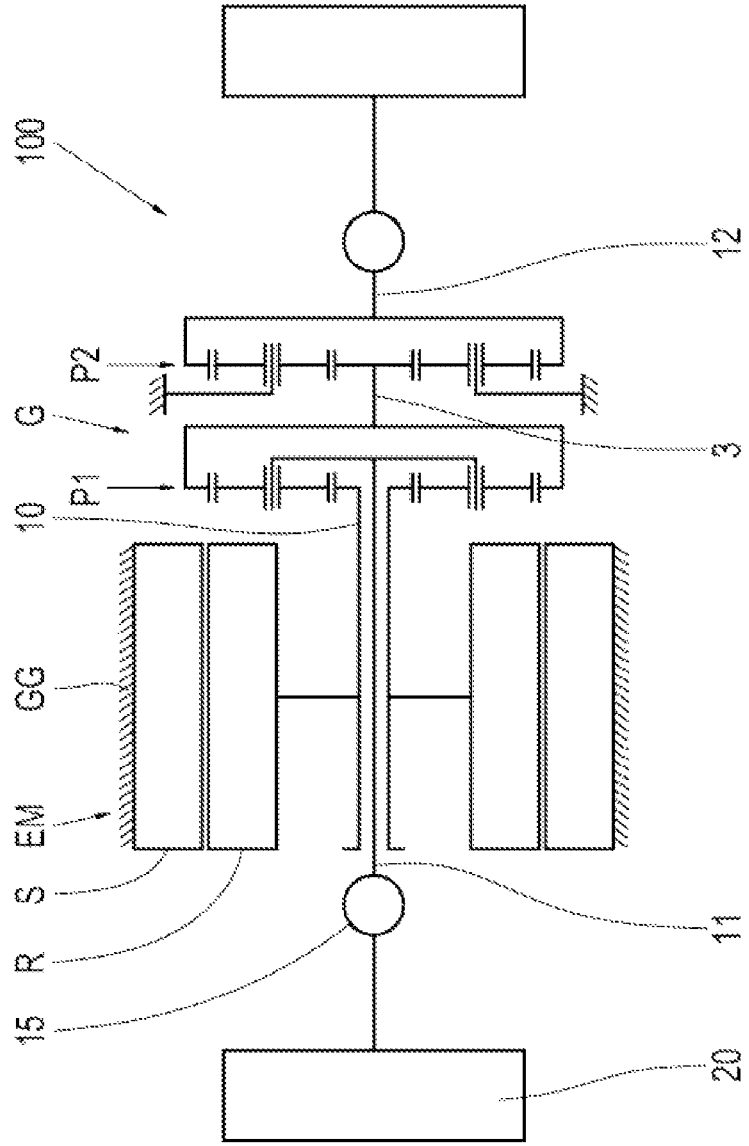

FIG. 11 shows a drive train for a vehicle, with a transmission according to the invention, in another preferred embodiment. The transmission G is the preferred embodiment in FIG. 2, to which reference is made. Unlike in FIG. 10, there is no upstream step-up gearing. The drive machine is in the form of an electric machine EM. The electric machine EM has a stator S and a rotor R in a housing. The rotor R is connected to the input shaft 10 for conjoint rotation. The electric machine EM is coaxial to the input shaft 10 and to the output shafts 11, 12, as can be readily seen. It is also coaxial to the planetary gearsets P1, P2. The input shaft 10 is in the form of a hollow shaft, through which the first output shaft 11 passes. For all other details, reference is made to the explanations regarding FIG. 10.

Figure 12:
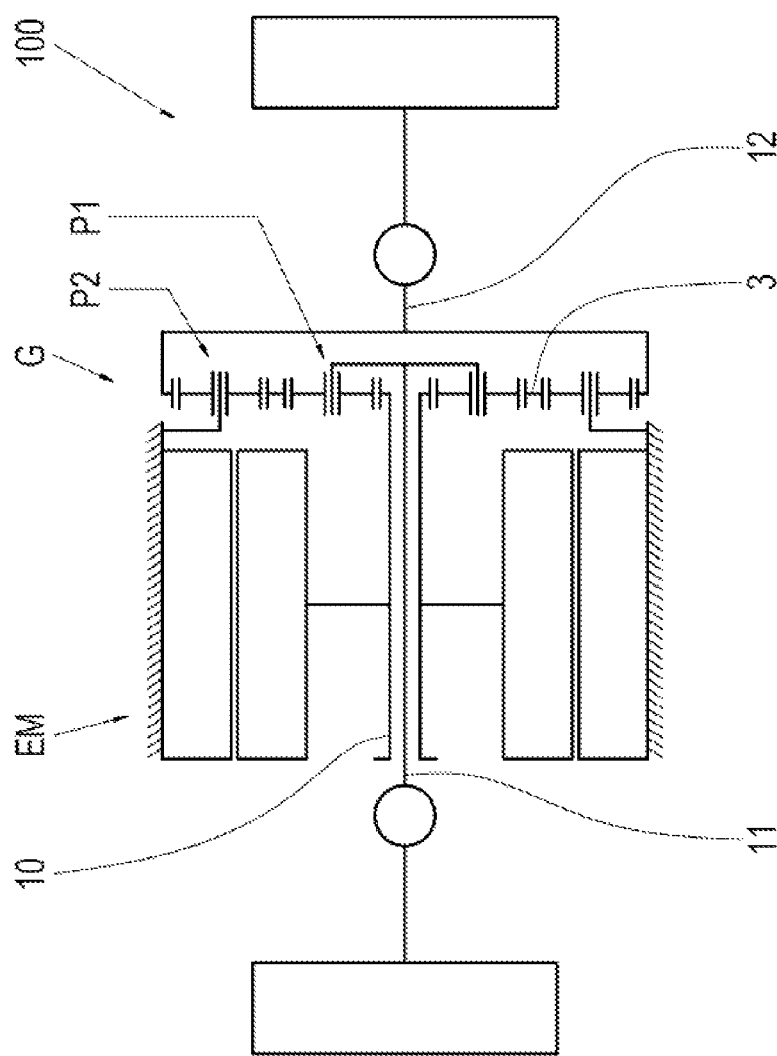

FIG. 12 shows another drive train 100, which has a transmission G, in a preferred embodiment. Unlike the embodiment in FIG. 11, the planetary gearsets P1, P2 are not axially adjacent, but place radially above one another, i.e. nested. The transmission G is therefore the preferred embodiment shown in FIG. 3. For all other details, reference is made to the explanations regarding FIG. 11 and FIG. 3.

FIG. 13 shows a drive train 100 in another preferred embodiment. This embodiment resembles the embodiment in FIG. 11, with the difference that the axis of the electric machine EM is not coaxial, but parallel to the transmission G. The connection is obtained via a spur gear step SRS, composed of a first spur gear SR1 and a second spur gear SR2. The first spur gear SR1 is connected to the input shaft 10 for conjoint rotation in this case. The first spur gear SR1 then meshes with the second spur gear SR2, which is placed on an input shaft EW for the electric machine EM, for conjoint rotation therewith, which then forms the connection to the rotor in the electric machine EM, which is not shown in the present case.

Otherwise, the embodiment in FIG. 13 corresponds to the that in FIG. 11, such that reference can be made to the descriptions thereof in this regard.

FIG. 14 shows the preferred embodiment of the transmission G in FIG. 3, in a cutaway view. The shaft in the middle is the output shaft 11. The input shaft 10 coincides with the sun gear in P1 in this drawing, i.e. the input shaft 10 is connected to a sun gear in the first planetary gearset P1. The sun gear in the first planetary gearset P1 then meshes with the planet gears in the first planetary gearset P1. The planet gears in the first planetary gearset P1 then mesh with the encompassing ring gear in the first planetary gearset P1, wherein the ring gear also forms the sun gear for the second planetary gearset P2. The sun gear for the second planetary gearset P2 then meshes with the planet gears in the second planetary gearset P2. The planet gears in the second planetary gearset P2 then mesh with the ring gear encircling the planet gears in the second planetary gearset P2.

As can be readily seen, the number of planets in the second planetary gearset is greater than the number of planets in the first planetary gearset. According to this embodiment, the second planetary gearset P2 has six planets, while the first planetary gearset only has four.

A large transmission gear ratio can be obtained with this configuration, which in turn makes it possible to obtain a particularly compact and cost-effective electric machine.

A large transmission gear ratio, according to the calculation rule $$i\_02 = 1/i\_01 - 1$$

results in a smaller standard transmission gear ratio at the second planetary gearset P2. A smaller standard transmission gear ratio then results in smaller planet diameters. Smaller planet diameters result in poorer meshings, and reduce the installation space for the planet bearings.

It has been shown to be the case that a higher number of planets in the second planetary gearset than in the first planetary gearset counteracts this effect.

The following FIGS. 15 to 17 show force input and force resistances of the invention in comparison with the prior art, e.g. DE 10 2011 079 975 A1. The prior art is compared with the preferred embodiment that has two negative planetary gearings, such as those described in FIGS. 2 and 3, etc. This also applies accordingly to the other embodiments.

In general, the following applies for FIGS. 15 to 17:

The torque of the input shaft 10 is converted at the first planetary gearset P1 into the output torque for the first output shaft 11. The third element E31 in the first planetary gearset P1 (which is also the first element E12 in the second planetary gearset P2) is driven backwards by its reaction torque. The reverse movement of the third element E31 is allowed, such that a part of the mechanical drive power (preferably 50% in the case of a transverse differential, when driving in a straight line) is conducted through the first planetary gearset P1 into the second planetary gearset.

Furthermore, the transmission ratio to the first output shaft 11 is enlarged by the reverse rotation (standard transmission gear ratio i0=−3 with a stationary ring gear only enables a transmission ratio of i=4).

In the second planetary gearset P2, the direction of rotation (reverse) applied to the first element (E12) is reversed (forwards) in the output drive movement of the second output shaft (12) using the housing resistance (E22). The torque input to the second planetary gearset P2 and the torque obtained from the second output shaft (12) are combined at this point to obtain the housing resistance torque. The second planetary gearset P2 only transfers the portion of the mechanical power conducted to the second output shaft (12) at this point (typically 50%). The second planetary gearset P2 is only subjected to a portion of the power, such that the overall efficiency is influenced in a positive manner.

A torque conversion normally takes place in the prior art with the aid of a housing resistance. The reaction torque of the step-up gearing is conducted directly into the housing in this case, and is not used to generate the second output drive torque. The result is that a transmission for the combined torques of the two output shafts must first be designed (normally twice the torque). A separate differential transmission is subsequently needed in order to divide the combined torque into two output torques, which in this form is never needed.

The individual FIGS. 15 to 18 show, concretely:

FIG. 15 shows, schematically, the first planetary gearset P1 for the transmission G (on the right) and a first step of the spur gear differential from the prior art (on the left). The power input from the planet gears to the sun gear takes place in parallel via 3 stationary, i.e. fixed, gear meshings. The output to the first output shaft takes place via the sun gear.

The power input according to the preferred embodiment takes place, in contrast, in parallel, via eight moving, i.e. rotating, gear meshings. There are four gear meshings between the sun gear SO1 and four planet gears. Four more gear meshings are formed between each planet gear and the ring gear HO1, not shown. The output to the first output shaft 11 takes place via the planet carrier PT1. The technological effect lies in the clearly lower tooth forces acting on the first planetary gearset.

FIG. 16 shows, schematically, the second planetary gearset P2 in the transmission G (on the right) and a second step of the step planets from the prior art (on the left). The power input from the planet gears to the sun gear takes place in parallel via 3 stationary, i.e. fixed, gear meshings. The output to the second output shaft takes place via the sun gear.

The power input to the second planetary gearset P2 according to the preferred embodiment takes place, in contrast, in parallel, via 6 moving, i.e. rotating, gear meshings. The six gear meshings each act between one of the six planet gears and the ring gear HO2. The fixed planet carrier PT2, which support the six planet gears and the sun gear SO2, is not shown. The output to the second output shaft 12 takes place via the ring gear HO2. The technological effect lies in the significantly lower gear forces obtained due to the larger effective diameter and due to the larger possible number of planets in the second planetary gearset.

FIG. 17 shows, schematically, the input of the resistance torque into the housing. The power input with stepped planets according to the prior art (on the left) takes place via 3 parallel gear meshings in a stationary ring gear.

The power input according to the preferred embodiment takes place via 12 parallel gear meshings in the stationary planet carrier PT2. Six gear meshings act between the sun gear SO2 and the six planet gears in the second planetary gearset. The other six gear meshings act between each planet gear in the second planetary gearset and the ring gear HO2. The technological effect lies in the significantly lower gear forces acting on the second planet carrier PT2.

Figure 18:
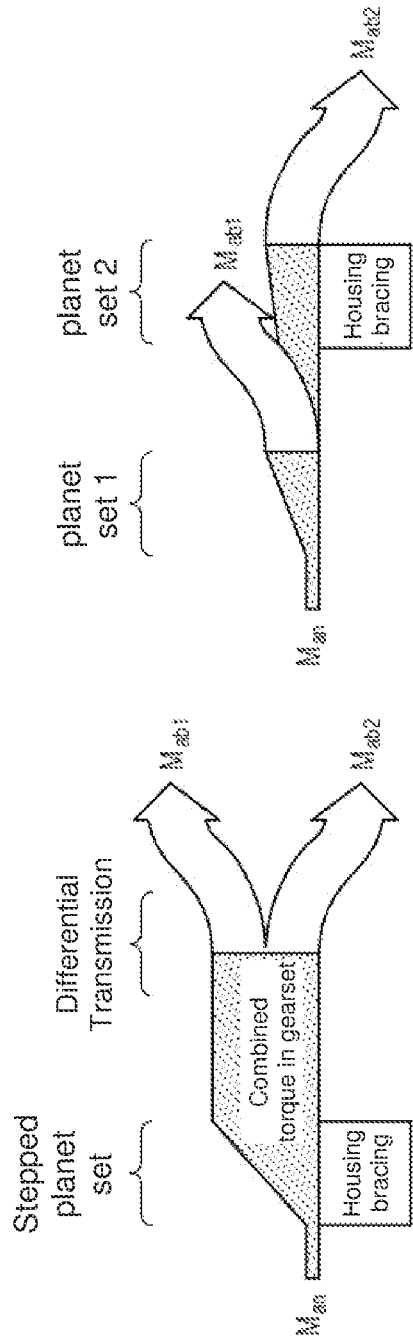

FIG. 18 shows the principle shown in greater detail in FIGS. 15 to 17 in another perspective.

The greatest torque in the gearset according to the invention (on the right) corresponds to the output torque for a single wheel. Only the housing resistance has a physical effect resulting in a high torque factor.

The stepped planetary gearset according to the prior art (on the left) generates the entire output torque from an input torque Man, i.e. the combined torque for both wheels. The differential divides this high torque into two half wheel torques Man1 and Man2.

The paths of the torques are illustrated symbolically in the drawing. The directions of rotation cannot be derived therefrom.

FIG. 19 shows an overview of the calculating rule for the standard transmission gear ratios for the individual embodiments. These result in equal torques, ignoring the transmission losses, and have the same symbol (+, −) at both output shafts 11, 12. i01 indicates the standard transmission gear ratio for the first planetary gearset P1. i02 indicates the standard transmission gear ratio for the second planetary gearset P2. Depending on the use of the transmission, one of the planetary gearset configurations can be selected with a corresponding standard transmission gear ratio.

Figure 20:
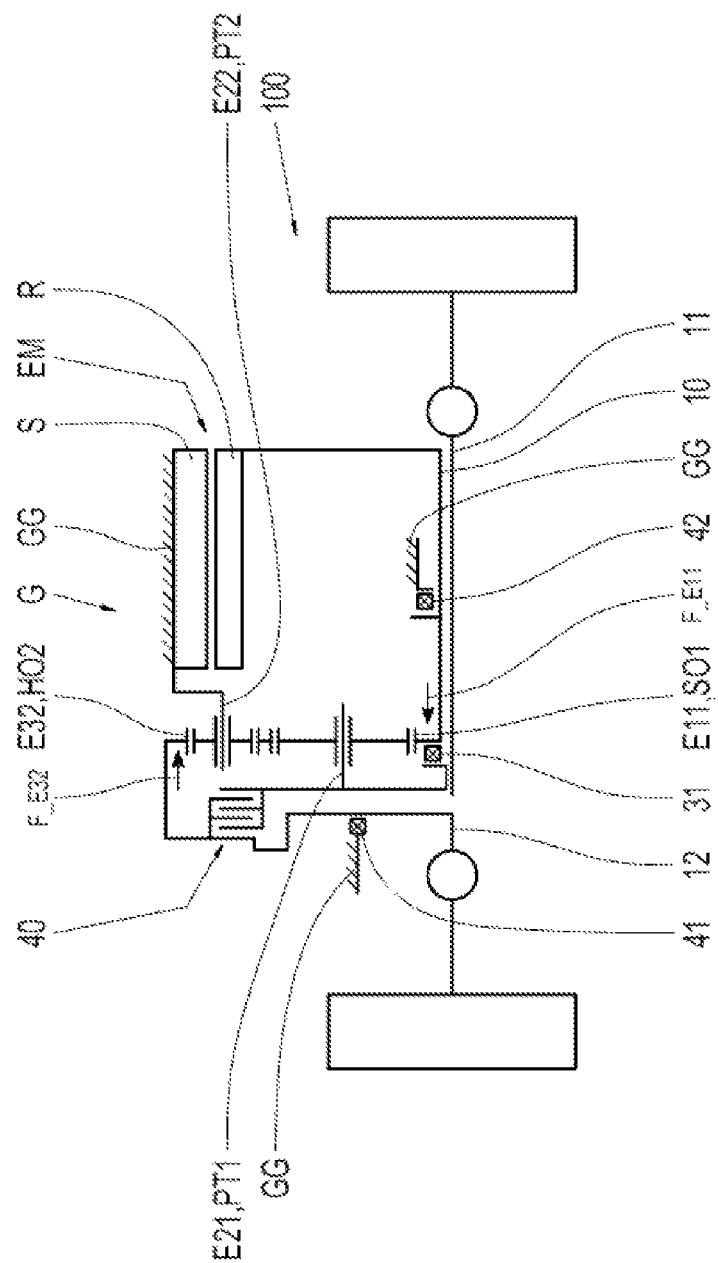
FIG. 20 shows an image illustrating the principle of the functioning of the connecting means according to the invention between the first and second output shafts of the transmission in FIGS. 2 to 19.

FIG. 20 shows an image illustrating the principle of the fundamental functioning of the connecting means according to the invention in a transmission according to any of the FIGS. 2 to 13.

The transmission gearset used in FIGS. 20 to 25 corresponds to that transmission gearset shown in FIGS. 3 and 12. This is the embodiment in which the first and second planetary gearsets P1, P2 are arranged radially above one another. At this point is should be noted that the connecting means 40, which shall be explained below, can be used in any of the embodiments in FIGS. 2 to 13.

Regarding the structural embodiment of the transmission G shown in FIG. 20, reference is made to the explanations relating to FIG. 3. Regarding the connection of the electric machine EM to the input shaft 10, reference is made to the explanations relating to FIG. 12.

Based on the embodiments shown in FIGS. 3 and 12, there is also a connecting means 40, which can connect the first output shaft 11 and the second output shaft 12 in the actuated state for conjoint rotation. The connecting means is presently in the form of a multi-disk clutch, by way of example.

The axial forces present in the helical gearing are illustrated in this image. An axial force F_E32 acts on the third element E32 in the second planetary gearset P2, i.e. the ring gear HO2. An axial force F_E11 acts on the first element E11 in the first planetary gearset P1, i.e. the sun gear SO1.

The respective second elements E21, E22, i.e. the two planet carriers PT1, PT2 are axially counterbalanced. The shaft 3 is also axially counterbalanced by means of an appropriate pitch of the gearing on the shaft 3. The axial forces F_E32 and F_E11 are therefore the only noticeable axial forces on the planet gearsets P1 and P2. The directions of pitch are selected such that the arrows correspond to the traction mode "forwards."

The axial force F_E11 present in the helical gearing in the sun gear SO1 presses via a bearing 31 on the planet carrier PT1 in the first planetary gearset P1 (note: E21 and PT1 do not have reference symbols in FIG. 20). The axial force F_E32 present in the helical gearing in the ring gear HO2 pulls on the output shaft 12. The output shaft 12 is braced against the planet carrier PT2 in the second planetary gearset P2 via the friction element 40. In other words, the forces F_E11 and F_E32 are counterbalanced against one another. This means that the forces from the helical gearing are not conducted over the transmission housing in the more common case of the forward traction mode.

The axial force of the helical gearing is therefore transferred via the multi-disk clutch 40. As a result, a load-dependent contact pressure of the friction element that is proportional to the torque, and therefore a load-dependent locking torque, is generated in the forward traction mode (and in the reverse pushing mode). The force flow circuit of the axial forces through the helical gearing is closed via the friction element in the multi-disk clutch 40.

The advantage of this principle, in addition to the torque-proportional locking effect, is the low bearing losses. There is also the advantage of an improved acoustic behavior, because the axial forces of the gear teeth, and therefore their overlapping axial vibrations, are not conducted into the housing.

The axial bearing 31 is the only bearing that transfers axial force with a difference in the rotational rate, assuming the output shafts are rotating at the same speed. In an alternative fixed bearing of both the rotor R and the second output shaft 12, both fixed bearings would transfer an axial force to the housing when rotating. The losses would be higher.

The bearings 41 and 42 for the housing would only be subjected to axial forces from the gear teeth in the forward traction mode or in the reverse pushing mode. They are installed with axial play, in order to obtain a floating bearing.

Figure 21:
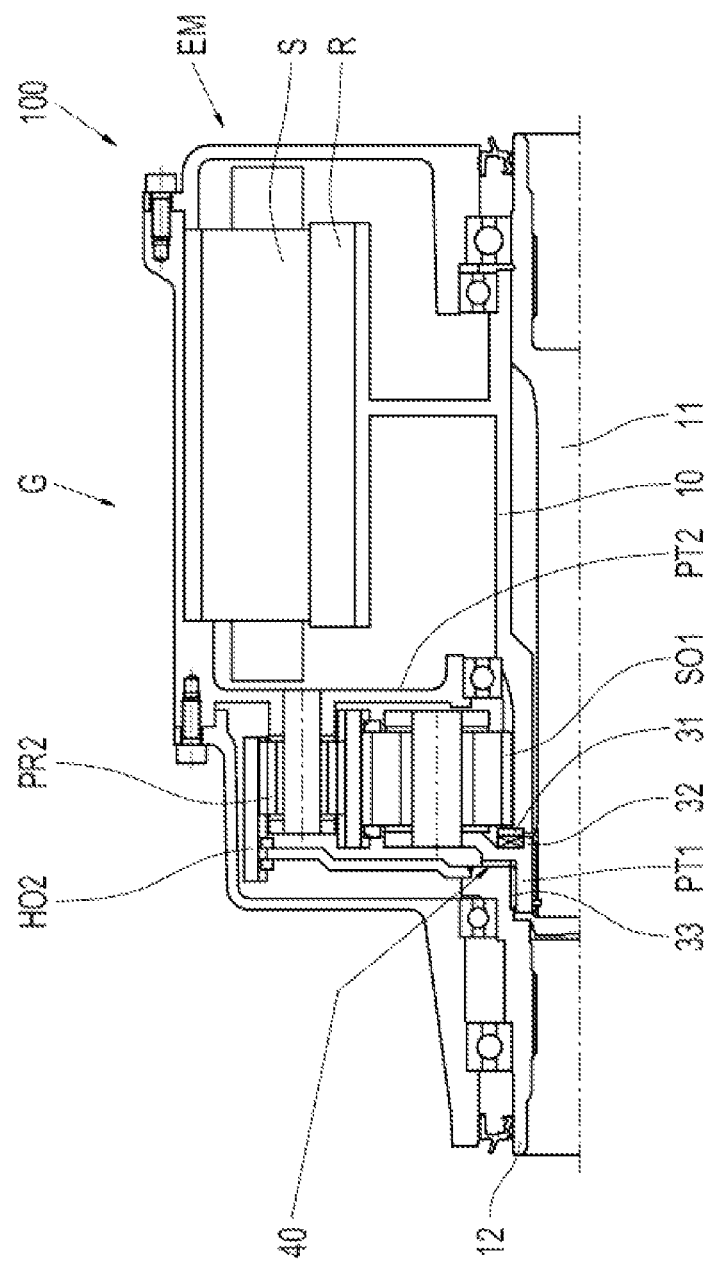
FIGS. 21-25 show preferred embodiments of the connecting means shown in FIG. 20.

FIG. 21 shows a first embodiment of the principle illustrated in FIG. 20, in particular with a friction element 40 in the form of an axial sliding bearing. An axial sliding bearing can also be understood to be a disk clutch with only one pair of friction surfaces.

The rotor R in the electric machine EM has a floating bearing. The sun gear SO1 is built directly into the rotor shaft. The rotor shaft therefore also forms the input shaft 10. The rotor shaft presses against the first planet carrier PT1 in the first planetary gearset P1 in the forward traction mode via an axial adjustment disk 31 and an axial needle bearing 32. The axial force is then conducted to the ring gear HO2 via the adjacent axial sliding bearing 40, in order to close the force flow circuit. Because the sliding bearing 40 is located on a shaft, specifically the output shaft 12, with a relatively small diameter, and also only has one pair of friction surfaces, which are not conical, the locking torque that can be generated is relatively low. The advantage of this solution lies in the comparatively simple construction and in the low thermal load to the friction element 40.

Figure 22:
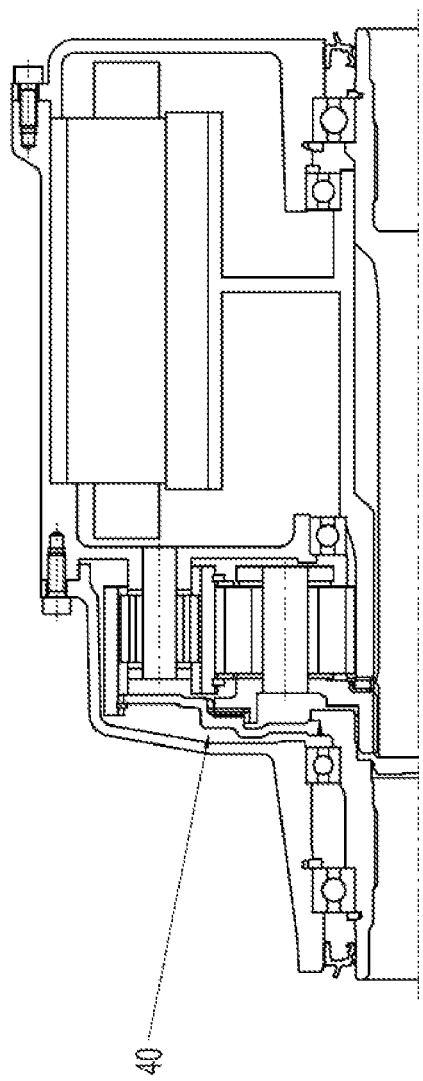

FIG. 22 shows another embodiment of the principle illustrated in FIG. 20, in particular with a friction element 40 in the form of a multi-disk clutch. The advantage of a multi-disk clutch is that, in comparison with a sliding bearing (FIG. 21), a greater locking torque can be generated.

In comparison to the embodiment shown in FIG. 21, instead of a sliding bearing, there is a multi-disk clutch 40 with three pairs of friction surfaces. Other numbers of friction surfaces are also conceivable. An odd number of pairs of friction surfaces, e.g. one pair, three pairs, five pairs, or seven pairs, is particularly advantageous, because there is then no need for a bearing point. An increase in the number of pairs of friction surfaces working in parallel results in an increase in the locking value. The multi-disk clutch 40 is of particular advantage with higher performance demands to the transmission, or vehicle. With a multi-disk clutch, the locking torque can also be increased when the diameter of the friction, i.e. the diameter of the friction elements, is increased.

Figure 23:
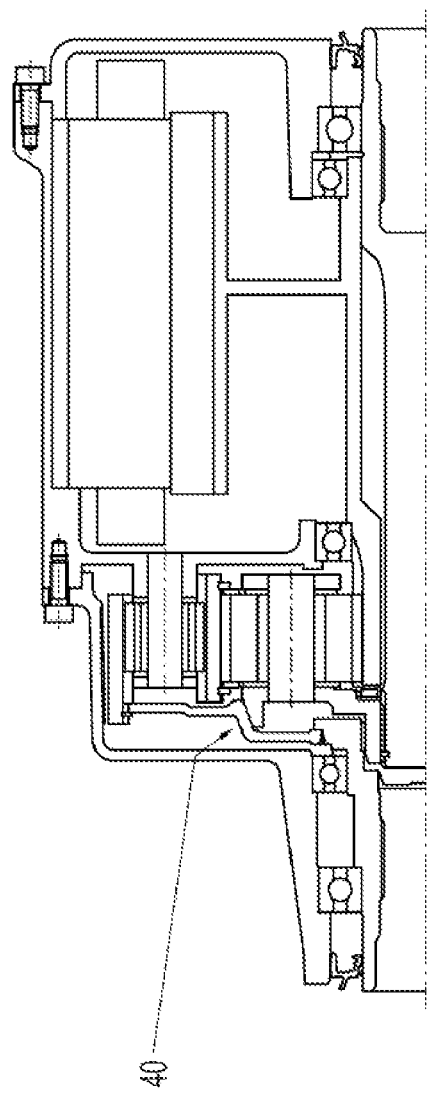

FIG. 23 shows an embodiment of the transmission with a conical clutch serving as the connecting means 40 between the first and second output shafts 11, 12. This embodiment is designed exactly like the embodiment shown in FIG. 22 with regard to the locking value. As a result of the lower number of friction surfaces and components, this embodiment can be more cost-effective than the embodiment with friction disk(s). Because of the smaller friction surfaces, it cannot withstand the same thermal loads when subjected to high surface pressures. The friction cones in FIG. 23 are integral parts of the output shaft 11 or the first planet carrier PT1. They can also be separate parts, however, and then connected to the first output shaft 11 or the first planet carrier PT1 via interlocking gear teeth. Integral friction cones are less expensive. Separate friction cones are normally more expensive. They allow for more flexibility in terms of the material selection, and are more able to prevent an undesired centering effect in the friction cone.

Figure 24:
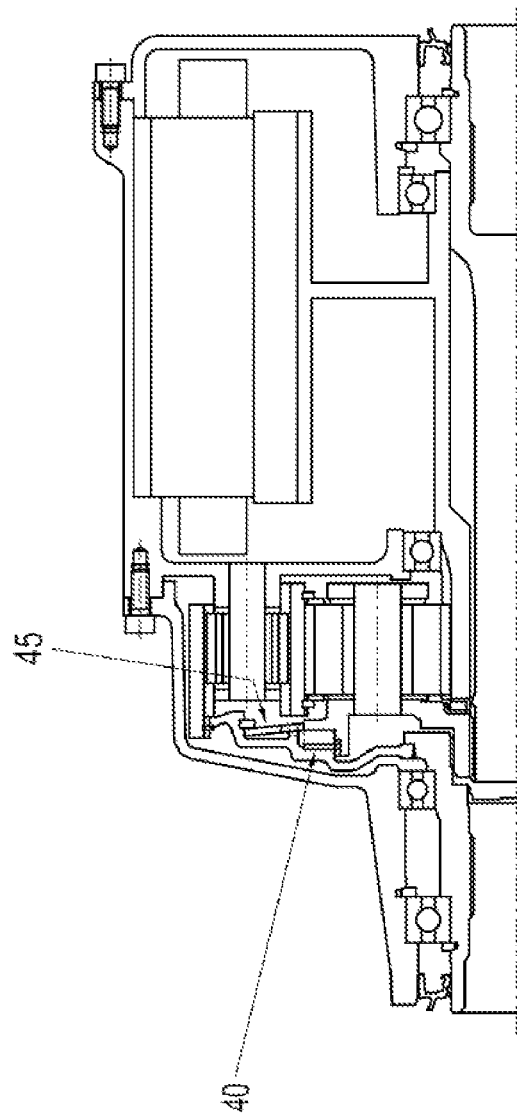

FIG. 24 shows an embodiment of the transmission with a pretensioned spring 45. In comparison with the embodiment shown in FIG. 22, this embodiment also allows for an additional, permanently set, locking torque, in addition to the torque-proportional locking torque. The connecting means 40 shown in FIG. 24 has three pairs of friction surfaces, like the embodiment shown in FIG. 22. A spring tension 45 loads two of the three pairs of friction surfaces with an overlapping, constant axial force. An even number of spring-loaded pairs of friction surfaces is preferably selected, in able to be able to eliminate an axial bearing. At this point, it should be noted that this is not to be confused with FIG. 22, in which there is an odd number of pairs of friction surfaces, in order to be able to eliminate an axial bearing.

The two left hand pairs of friction surfaces are therefore spring-loaded as well as being loaded in a torque-dependent manner in FIG. 24. The right hand pair of friction surfaces is only loaded in a torque-dependent manner. The spring element 45 is in the form of a slotted plate spring, and held in place with a snap ring.

The advantage with the torque-independent locking components is that a specific torque can then also be conducted to the wheel that has traction, if one of the wheels does not have traction, i.e. the traction is zero. With a purely torque-proportional locking effect, there is no locking effect if one of the wheels is not in contact with the ground (ignoring the effects of weight and friction). The pretensioning principle can also be used without conducting the axial force from the helical gearing via the friction surfaces.

Figure 25:
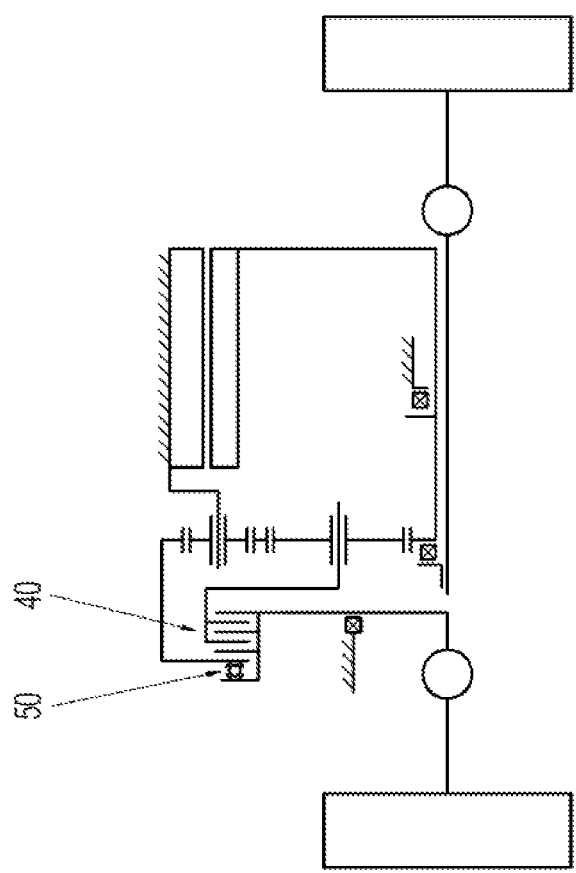

FIG. 25 shows an embodiment of the transmission with a curved ramp concept 50. The embodiments in FIGS. 20 to 24 each use the axial force resulting from a helical gearing to press friction elements against one another and therefore generate friction. The disadvantage with this is that the potential axial force is limited to the force of the gearing. It would be possible to increase the pitch. There are other criteria that play a role in the design of the gearing, however, which must be taken into account. Furthermore, the axial force would be conducted into an axial bearing, which normally exhibits high losses. Furthermore, the use of the axial force from the gearing only functions with one sign (+, −) for the torque, i.e. in the traction mode in the present case.

These disadvantages are resolved by the embodiment shown in FIG. 25, in that a torque is conducted over a curved ramp 50, and the contact pressure for the friction element 40 is generated in this manner. In this case, the output torque of the ring gear HO2 is conducted to the second output shaft 12 via a curved ramp 50. The curved ramp 50 generates an axial force in this case that is proportional to the torque. This axial force is then applied to the frictional clutch element 40, in this case a multi-disk clutch element, and generates the torque-proportional locking torque. The advantage with the curved ramp is that it also functions in the pushing mode, and the axial force can be set arbitrarily through the selection of the pitch of the curved ramp. The curved ramp 50 can be identical to the traction and pushing flanks, to obtain an identical locking effect in both the traction and pushing modes. The traction and pushing flanks can also differ, in order to obtain different locking effects. The curved ramp 50 has spherical roller bearings in FIG. 25. It can also have conical or cylindrical roller bearings, or it can be designed as a sliding bearing.

Alternatively, the output torque of the planet carrier PT1 on the way to the first output shaft 11 can also be used to obtain an axial force formed by the curved ramp from the torque.

The friction element 40 can also be pretensioned with a spring, in a manner analogous to that described in reference to FIG. 24, in order to obtain a fundamental locking torque. This embodiment has the advantage that a relatively high locking value can be generated. The locking value can be adjusted by altering the geometry of the curved ramp, the diameter of the friction, and/or the number of friction surfaces.

Furthermore, the surface-specific friction load in the case of a difference in rotational rates is relatively low in comparison with the conical variation shown in FIG. 23 due to the friction surfaces that work in parallel. The embodiment shown in FIG. 24 is therefore ideal for higher performance demands. As a matter of course, the curved ramp 50 can also be combined with the conical clutch described in reference to FIG. 23.

The invention is comprehensively described and explained in reference to the drawings and the description. The description and explanation are to be understood being by way of example, and not as limiting. The invention is not limited to the disclosed embodiments. Other embodiments or variations can be derived by the person skilled in the art when using the invention, as well as with a precise analysis of the drawings, the disclosure, and the following claims.

In the claims, the words "comprising" and "having" do not exclude the presence of other elements of steps. The indefinite articles "a" or "an" do not exclude the presence of a plurality. A single element or a single unit may execute the functions of numerous units specified in the claims. The simple specification of some measures in numerous different dependent claims is not to be understood to mean that a combination of these measures may not also be advantageously used.

REFERENCE SYMBOLS

G transmission
GG non-rotating component, housing
E11 first element of the first planetary gearset
E21 second element of the first planetary gearset
E31 third element of the first planetary gearset
E12 first element of the second planetary gearset
E22 second element of the second planetary gearset
E32 third element of the second planetary gearset
E13 first element of the third planetary gearset
E23 second element of the third planetary gearset
E33 third element of the third planetary gearset
P1 first planetary gearset
P2 second planetary gearset
P3 third planetary gearset
SO sun gear
PT planet carrier
HO ring gear
EM electric machine
S stator
R rotor
EW input shaft of the electric machine
SRS spur gear step
SR1 first spur gear
SR2 second spur gear
SE shifting element
G1 first shifting position, first gear step
G2 second shifting position, second gear step
N neutral position
VM internal combustion engine
A vehicle axle, rear
B vehicle axle, front
3 shaft
10 input shaft
11 first output shaft
12 second output shaft
15 joint
20 wheels
31 bearing
40 connecting means, friction clutch, multi-disk clutch, conical clutch, sliding bearing
41 bearing
42 bearing
45 spring
50 curved ramp
99 direction of travel, forwards
100 drive train
1000 vehicle
i01 standard transmission gear ratio for the first planetary gearset
i02 standard transmission gear ratio for the second planetary gearset

The invention claimed is:

1. A transmission comprising:
   an input shaft,
   a first output shaft,
   a second output shaft,
   a first planetary gearset, the first planetary gearset comprising a first element, a second element and a third element, and
   a second planetary gearset connected to the first planetary gearset, the second planetary gearset comprising a first element, a second element and a third element,
   wherein the input shaft, the first and second output shafts, and the planetary gearsets are arranged such that:
   a torque input via the input shaft is converted and distributed in a defined ratio to the two output shafts, and
   the formation of a combined torque is prevented,
   wherein at least one element of the first planetary gearset is connected to at least one element of the second planetary gearset with a shaft for conjoint rotation, and
   wherein at least one element of the second planetary gearset is fixed in place on a non-rotating component, and
   wherein a connector is arranged and configured to passively connect the first output shaft and second output shaft such that a torque can be transferred between the first output shaft and the second output shaft, wherein the first planetary gearset and the second planetary gearset each have a helical gearing,
   wherein a force flow circuit of axial forces through the helical gearing is closed via the connector in at least one of a forward traction mode or a reverse pushing mode of the transmission.

2. The transmission according to claim 1, wherein
   the input shaft is connected to the first element of the first planetary gearset for conjoint rotation and
   the first output shaft is connected to the second element of the first planetary gearset for conjoint rotation;
   wherein the third element of the first planetary gearset is connected to the first element of the second planetary gearset for conjoint rotation; and
   wherein the second element of the second planetary gearset is fixed in place on the non-rotating component of the transmission; and
   the second output shaft is connected to the third element of the second planetary gearset for conjoint rotation.

3. The transmission according to claim 1, wherein the pitch of the gearing of the third element in the first planetary gearset and the pitch of the gearing of the first element of the second planetary gearset are identical, resulting in a connecting part or coupling shaft that is not subjected to axial forces.

4. The transmission according to claim 1, wherein the connector is a multi-disk clutch.

5. The transmission according to claim 1, wherein the connector includes a set of friction surfaces, and wherein the friction surfaces are flat.

6. The transmission according to claim 5, wherein a contact pressure of the friction surfaces is obtained with a torque-dependent contact pressure.

7. The transmission according to claim 6, wherein the contact pressure is obtained with a helical gearing, wherein the sign (+, −) of the pitch is selected such that in the forward traction mode, the first element in the first planetary gearset and the third element in the second planetary gearset act counter to one another.

8. The transmission according to claim 5, wherein a contact pressure is obtained with a curved ramp located between the third element of the second planetary gearset and the second output shaft.

9. The transmission according to claim 5, wherein a contact pressure is obtained with a curved ramp, and wherein the curved ramp is located between the second element in the first planetary gearset and the first output shaft.

10. The transmission according to claim 1, wherein the connector includes a set of friction surfaces, and wherein the friction surfaces are conical.

11. The transmission according to claim 1, wherein either a friction element configured as a friction disk or a friction cone or a component adjacent to the friction disk or friction cone is arranged and configured such that an axial play of the second element in the first planetary gearset, and/or the third element in the second planetary gearset, and/or the input shaft can be adjusted.

12. The transmission according to claim 1, wherein at least one friction surface is part of the second element in the first planetary gearset or the third element of the second planetary gearset.

13. The transmission according to claim 1, wherein at least one friction surface is located on a component that conducts the output torque to one of the two output shafts.

14. The transmission according to claim 1, wherein the input shaft and/or the first element of the first planetary gearset is supported in a floating manner.

15. The transmission according to claim 1, wherein the second element of the first planetary gearset and/or the third element of the second planetary gearset is supported in a floating manner.

16. The transmission according to claim 1, wherein the connector includes a set of friction surfaces, wherein the contact pressure of the friction surfaces is obtained with a constant contact pressure, and wherein the constant contact pressure is obtained via a pretensioned spring.

17. The transmission according to claim 16, wherein the pretensioned spring includes at least one of a plate spring having a slotted plate and an undular washer.

18. The transmission according to claim 16, wherein the friction surfaces are spring-loaded and also subjected to axial forces from a helical gearing on the first element in the first planetary gearset and/or the third element in the second planetary gearset.

19. The transmission according to claim 16, wherein at least one friction surface includes at least one of a friction disk and a friction cone that is wave-shaped.

20. The transmission according to claim 1, wherein the connector is a liquid friction clutch.

* * * * *